(12) United States Patent
Chang

(10) Patent No.: US 11,667,350 B2
(45) Date of Patent: Jun. 6, 2023

(54) DAMPER FOR A BICYCLE COMPONENT

(71) Applicant: SRAM, LLC, Chicago, IL (US)

(72) Inventor: Jih-Hung Chang, Taichung (TW)

(73) Assignee: SRAM, LLC, Chicago, IL (US)

(*) Notice: Subject to any disclaimer, the term of this patent is extended or adjusted under 35 U.S.C. 154(b) by 175 days.

(21) Appl. No.: 17/108,535

(22) Filed: Dec. 1, 2020

(65) Prior Publication Data

US 2021/0078673 A1 Mar. 18, 2021

Related U.S. Application Data

(63) Continuation of application No. 15/632,945, filed on Jun. 26, 2017, now Pat. No. 10,882,587.

(51) Int. Cl.
| | |
|---|---|
| *B62M 9/126* | (2010.01) |
| *B62M 9/16* | (2006.01) |
| *B62M 9/1244* | (2010.01) |
| *B62M 9/1248* | (2010.01) |
| *B62K 19/18* | (2006.01) |
| *B62M 9/128* | (2010.01) |
| *B62L 3/00* | (2006.01) |

(52) U.S. Cl.
CPC ............. *B62M 9/126* (2013.01); *B62K 19/18* (2013.01); *B62M 9/128* (2013.01); *B62M 9/1244* (2013.01); *B62M 9/1248* (2013.01); *B62M 9/16* (2013.01); *B62L 3/00* (2013.01)

(58) Field of Classification Search
CPC ...... B62M 9/126; B62M 9/1248; B62M 9/16; B62M 9/121; B62M 9/1244

USPC ..................................................... 474/80, 82
See application file for complete search history.

(56) References Cited

U.S. PATENT DOCUMENTS

| | | | | |
|---|---|---|---|---|
| 4,406,643 | A | * | 9/1983 | Shimano .............. B62M 9/1248 474/82 |
| 4,563,167 | A | * | 1/1986 | Foster ................... F16H 7/1236 474/135 |
| 5,152,720 | A | | 10/1992 | Browning et al. |
| 6,135,904 | A | * | 10/2000 | Guthrie .................. B62M 9/122 474/82 |

(Continued)

FOREIGN PATENT DOCUMENTS

| | | |
|---|---|---|
| CN | 102741588 A | 10/2012 |
| CN | 103693156 A | 4/2014 |

(Continued)

*Primary Examiner* — Henry Y Liu

(57) ABSTRACT

A bicycle rear derailleur includes a movable member and a chain guide assembly rotatably connected to the movable member. The bicycle rear derailleur also includes a pivot member non-rotatably coupled to the chain guide assembly and having an outer annular surface, a biasing device configured to bias the chain guide assembly in a first rotational direction relative to the movable member, and a damper device disposed between the chain guide assembly and the movable member. The damper device is operable to apply a damping force to the chain guide assembly when the chain guide assembly rotates in a second rotational direction relative to the movable member. The damper device includes a friction device that is radially inner relative to the biasing device. The friction device includes a friction member having at least one friction surface biased against and in frictional engagement with the pivot member.

20 Claims, 15 Drawing Sheets

(56) References Cited

U.S. PATENT DOCUMENTS

| | | | |
|---|---|---|---|
| 6,350,212 B1* | 2/2002 | Campagnolo | B62M 9/126 474/82 |
| 8,202,182 B2 | 6/2012 | Ishikawa et al. | |
| 8,744,699 B2 | 6/2014 | Yamaguchi et al. | |
| 8,852,041 B2 | 10/2014 | Yamaguchi et al. | |
| 8,870,692 B2 | 10/2014 | Yamaguchi et al. | |
| 8,870,693 B2 | 10/2014 | Shahana et al. | |
| 8,882,618 B2* | 11/2014 | Yamaguchi | B62M 25/08 474/82 |
| 8,900,078 B2* | 12/2014 | Yamaguchi | B62M 9/122 474/82 |
| 9,120,530 B2 | 9/2015 | Yamaguchi | B62M 9/126 |
| 9,187,149 B2 | 11/2015 | Yamaguchi | |
| 9,227,696 B2* | 1/2016 | Yamaguchi | B62M 9/126 |
| 9,228,643 B2* | 1/2016 | Yamaguchi | B62M 9/16 |
| 9,290,235 B2 | 3/2016 | Yamaguchi | |
| 9,377,089 B2 | 6/2016 | Yamaguchi | |
| 9,400,037 B2 | 7/2016 | Hara | |
| 9,463,846 B1* | 10/2016 | Chang | B62M 9/1248 |
| 9,669,900 B2 | 6/2017 | Shirai | |
| 9,751,590 B2 | 9/2017 | Shipman et al. | |
| 10,189,542 B2* | 1/2019 | Wu | B62M 9/1242 |
| 10,351,208 B2* | 7/2019 | Yamaguchi | B62M 9/1244 |
| 2003/0166427 A1 | 9/2003 | Dillon | |
| 2004/0116222 A1* | 6/2004 | Shahana | B62M 9/125 474/82 |
| 2007/0219029 A1* | 9/2007 | Turner | B62M 9/16 474/69 |
| 2008/0026890 A1* | 1/2008 | Oseto | B62M 9/1242 474/82 |
| 2008/0026891 A1* | 1/2008 | Oseto | B62M 9/1242 474/82 |
| 2008/0026897 A1 | 1/2008 | Nakashima | |
| 2009/0054183 A1* | 2/2009 | Takachi | B62M 9/121 474/80 |
| 2009/0291789 A1* | 11/2009 | Ishikawa | B62M 9/1248 474/82 |
| 2012/0083371 A1* | 4/2012 | Yamaguchi | B62M 9/126 474/80 |
| 2012/0083372 A1* | 4/2012 | Yamaguchi | B62M 9/126 474/80 |
| 2012/0142466 A1 | 6/2012 | Lin | |
| 2012/0258827 A1 | 10/2012 | Ishikawa et al. | |
| 2013/0090195 A1 | 4/2013 | Yamaguchi et al. | |
| 2013/0090196 A1* | 4/2013 | Yamaguchi | B62M 9/1244 474/80 |
| 2013/0203532 A1* | 8/2013 | Jordan | B62M 9/1248 474/82 |
| 2013/0288834 A1* | 10/2013 | Yamaguchi | B62M 9/126 474/80 |
| 2013/0310204 A1* | 11/2013 | Shahana | B62M 9/121 474/80 |
| 2014/0162817 A1* | 6/2014 | Yamaguchi | B62M 25/08 474/80 |
| 2014/0296009 A1* | 10/2014 | Suyama | B62M 9/122 474/80 |
| 2014/0371013 A1* | 12/2014 | Yamaguchi | B62M 9/126 474/122 |
| 2015/0072816 A1* | 3/2015 | Yamaguchi | F16H 7/0829 474/113 |
| 2016/0046352 A1* | 2/2016 | Shipman | B62M 9/16 29/428 |
| 2016/0304160 A9 | 10/2016 | Chang | |
| 2016/0304161 A1* | 10/2016 | Shirai | B62M 9/16 |
| 2016/0304162 A1 | 10/2016 | Takachi et al. | |
| 2018/0346058 A1* | 12/2018 | Brown | B62M 9/126 |

FOREIGN PATENT DOCUMENTS

| | | |
|---|---|---|
| CN | 103707994 A | 4/2014 |
| CN | 104443238 A | 3/2015 |
| CN | 104724246 A | 6/2015 |
| CN | 105365995 A | 3/2016 |
| CN | 106608344 A | 5/2017 |
| CN | 106627974 A | 5/2017 |
| CN | 106687706 A | 5/2017 |
| CN | 106741556 A | 5/2017 |
| DE | 102007040156 A1 | 2/2009 |
| DE | 102011114699 A1 | 4/2012 |
| DE | 202007019470 U1 | 11/2012 |
| DE | 102013001952 A1 | 8/2013 |
| EP | 0020092 A2 | 12/1980 |
| EP | 0031215 A2 | 7/1981 |
| JP | H02296024 A | 12/1990 |
| JP | H0544761 A | 2/1993 |
| JP | H07301272 A | 11/1995 |
| JP | H03267027 A | 11/1997 |
| JP | H1182593 A | 3/1999 |
| JP | 2008008418 A | 1/2008 |
| TW | 201343468 A | 11/2013 |
| TW | M481882 U | 7/2014 |
| TW | I460096 | 11/2014 |
| TW | I526362 | 3/2016 |
| TW | I558615 | 11/2016 |
| TW | I558616 | 11/2016 |
| TW | I586584 | 6/2017 |
| WO | 2007106867 A2 | 9/2007 |

* cited by examiner

DAMPER FOR A BICYCLE COMPONENT

This application is a continuation of U.S. patent application Ser. No. 15/632,945, filed Jun. 26, 2017, the contents of which are herein incorporated in their entirety.

BACKGROUND

1. Field of the Disclosure

The present disclosure is generally directed to a bicycle chain tensioner, and more particularly, to a damper for a bicycle rear derailleur.

2. Description of Related Art

Bicycle rear derailleurs are well known in the art as a part of a drivetrain of a bicycle. The typical drivetrain also includes a crank assembly that is coupled to one or more sprockets. The crank assembly is operable to drive a chain that is routed or wrapped around one of the sprockets. The chain is also routed to the rear wheel of the bicycle.

Rear derailleurs are provided as a part of the drivetrain to perform two basic functions. The primary function of the rear derailleur is to selectively shift a bicycle chain of the drivetrain among a series of different diameter cogs that are attached to the rear wheel. Shifting of the bicycle chain from one cog to another at the rear wheel is done in order to change the gear ratio of the drivetrain. The secondary function of the rear derailleur is to apply a tension to the chain to take-up slack, as well as to maintain the desired tension, in the chain on the non-drive-side of the drivetrain.

The rear derailleur accomplishes the tensioning function by employing a chain tensioning mechanism known as a chain tensioner. The chain tensioner typically has one or two rotatable cogs or pulleys and the chain is routed or wrapped around the pulleys. The chain tensioner is connected to the main body of the rear derailleur in a manner that allows the chain tensioner to pivot relative to the main body. The chain tensioner is also biased to pivot or rotate in a direction that tensions or applies a tensioning force to the chain.

When a bicycle travels over smooth terrain, the standard rear derailleur and chain tensioner are often sufficient to maintain enough tension in the chain so that the chain does not fall off the sprockets or cogs. However, when a bicycle travels over rough terrain, the forces transmitted to the rear derailleur can cause the chain tensioner to undesirably rotate in the chain slackening direction against the biasing force applied to the chain tensioner. This creates a slack condition in the chain. A slack chain can lead to the chain slapping against the frame of the bicycle. A slack chain can also lead to the chain falling off the sprockets or cogs.

A solution to this undesirable condition is to incorporate a damping system into the chain tensioning part of the derailleur. A damping system is designed to resist chain tensioner rotation, particularly in the chain slackening direction. A one-way damping system is configured to resist chain tensioner rotation in the chain slackening direction while still allowing free chain tensioner rotation in the chain tensioning direction. The typical one-way damping systems work by using a frictional element to provide a damping force in the chain slackening direction of chain tensioner rotation, and include a one-way roller clutch to prevent the frictional element from engaging in the chain tensioning direction.

These roller clutch based friction type damping systems are relatively heavy, which runs counter to a common performance goal of reducing bicycle weight. Further, this type of friction damping system may be rather complicated in construction, requiring multiple parts and numerous manufacturing steps. One result of the complicated nature of roller clutch based friction type damping systems is that the parts are relatively expensive, which increases the cost of the rear derailleurs.

SUMMARY

In one example, a bicycle rear derailleur includes a base member mountable to a bicycle frame, a movable member movably coupled to the base member, and a chain guide assembly rotatably connected to the movable member. The bicycle rear derailleur also includes a pivot member non-rotatably coupled to the chain guide assembly and having an outer annular surface, a biasing device configured to bias the chain guide assembly in a first rotational direction relative to the movable member, and a damper device disposed between the chain guide assembly and the movable member. The damper device is operable to apply a damping force to the chain guide assembly when the chain guide assembly rotates in a second rotational direction relative to the movable member. The second rotational direction is opposite the first rotational direction. The damper device includes a friction device that is radially inner relative to the biasing device. The friction device includes a friction member having at least one friction surface biased against and in frictional engagement with the pivot member.

In one example, the friction member is a torsion spring including a tab at a first end of the friction member. The tab of the torsion spring is positioned within a corresponding recess within the movable member. The torsion spring is configured to apply a radial spring force to the pivot member as the chain guide assembly rotates in the second rotational direction relative to the movable member from a first rotational position to a second rotational position. The radial spring force is greater and an inner diameter of the torsion spring is smaller when the chain guide assembly is in the second rotational position compared to when the chain guide assembly is in the first rotational position.

In one example, the movable member has a first side and a second side. The second side is opposite the first side. The movable member includes a first recess at the first side and a second recess at the second side. The torsion spring is positioned within the first recess, and the biasing device is positioned within the second recess.

In one example, the friction device is configured to generate a higher torque on the pivot member when the chain guide assembly rotates in the second rotational direction compared to when the chain guide assembly rotates in the first rotational direction.

In one example, the friction member has a first end and a second end. The first end and the second end are movable relative to the movable member.

In one example, the friction member has a first end and a second end. The first end is positionally fixed relative to the movable member. The second end is movable relative to the movable member.

In one example, the friction member is a torsion spring including a tab at the first end. The tab of the torsion spring is positioned within a corresponding recess within the movable member.

In one example, the at least one friction surface is a surface of the torsion spring. A first portion of the torsion spring is biased against and in frictional engagement with a portion of the pivot member, and a second portion of the torsion spring is biased against and in frictional engagement with a portion of the movable member.

In one example, the pivot member is made of a first material, and the portion of the movable member is made of a second material. The second material is different than the first material.

In one example, a damper device for a bicycle rear derailleur includes a friction device that is positionable radially inner relative to a biasing device of the bicycle rear derailleur. The damper device is disposable within a movable member of the bicycle rear derailleur. The damper device is operable to apply a variable damping force to a chain guide assembly rotatably attached to the movable member via a pivot member as the chain guide assembly rotates in a rotational direction relative to the movable member. The fiction device includes a friction member having a portion non-rotatably coupled to the movable member and having at least one friction surface biased against and in frictional engagement with the pivot member.

In one example, the friction member includes a torsion spring having a first end and a second end. The torsion spring includes a tab at the first end. The tab of the torsion spring is positionable within a corresponding recess within the movable member.

In one example, the torsion spring is configured to apply a radial spring force to the pivot member as the chain guide assembly rotates in the rotational direction relative to the movable member from a first rotational position to a second rotational position. The radial spring force is greater and an inner diameter of the torsion spring is smaller when the chain guide assembly is in the second rotational position compared to when the chain guide assembly is in the first rotational position.

In one example, the rotational direction is a first rotational direction and the chain guide assembly is rotatable in a second rotational direction. The second rotational direction is opposite the first rotational direction. The friction device is configured to generate a higher torque on the pivot member when the chain guide assembly rotates in the first rotational direction compared to when the chain guide assembly rotates in the second rotational direction.

In one example, the friction member has a first end and a second end. The first end and the second end are movable relative to the movable member.

In one example, a bicycle rear derailleur includes a base member mountable to a bicycle frame, a movable member movably coupled to the base member, and a chain guide assembly rotatably connected to the movable member. The bicycle rear derailleur also includes a pivot member non-rotatably coupled to the chain guide assembly and having an outer annular surface, a biasing device configured to bias the chain guide assembly in a first rotational direction relative to the movable member, and a damper device disposed within the movable member. The damper device is operable to apply a damping force to the chain guide assembly when the chain guide assembly rotates in a second rotational direction relative to the movable member. The second rotational direction is opposite the first rotational direction. The damper device includes a friction member that is radially inner relative to the biasing device. The friction member has at least one friction surface in frictional engagement with the pivot member. The friction member is configured to generate a higher torque on the pivot member when the chain guide assembly rotates in the second rotational direction compared to when the chain guide assembly rotates in the first rotational direction.

In one example, the friction member is always in physical contact with the pivot member.

In one example, the friction member has a first end and a second end. The first end is positionally fixed relative to the movable member.

In one example, the friction member is a torsion spring. The first end of the torsion spring is positioned within a corresponding recess within the movable member.

In one example, the at least one friction surface is a surface of the torsion spring biased against and in frictional engagement with the pivot member. The torsion spring is configured to apply a radial spring force to the pivot member as the chain guide assembly rotates in the second rotational direction relative to the movable member from a first rotational position to a second rotational position. The radial spring force is greater and an inner diameter of the torsion spring is smaller when the chain guide assembly is in the second rotational position compared to when the chain guide assembly is in the first rotational position.

In one example, the friction member has a first end and a second end. The first end and the second end are movable relative to the movable member.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
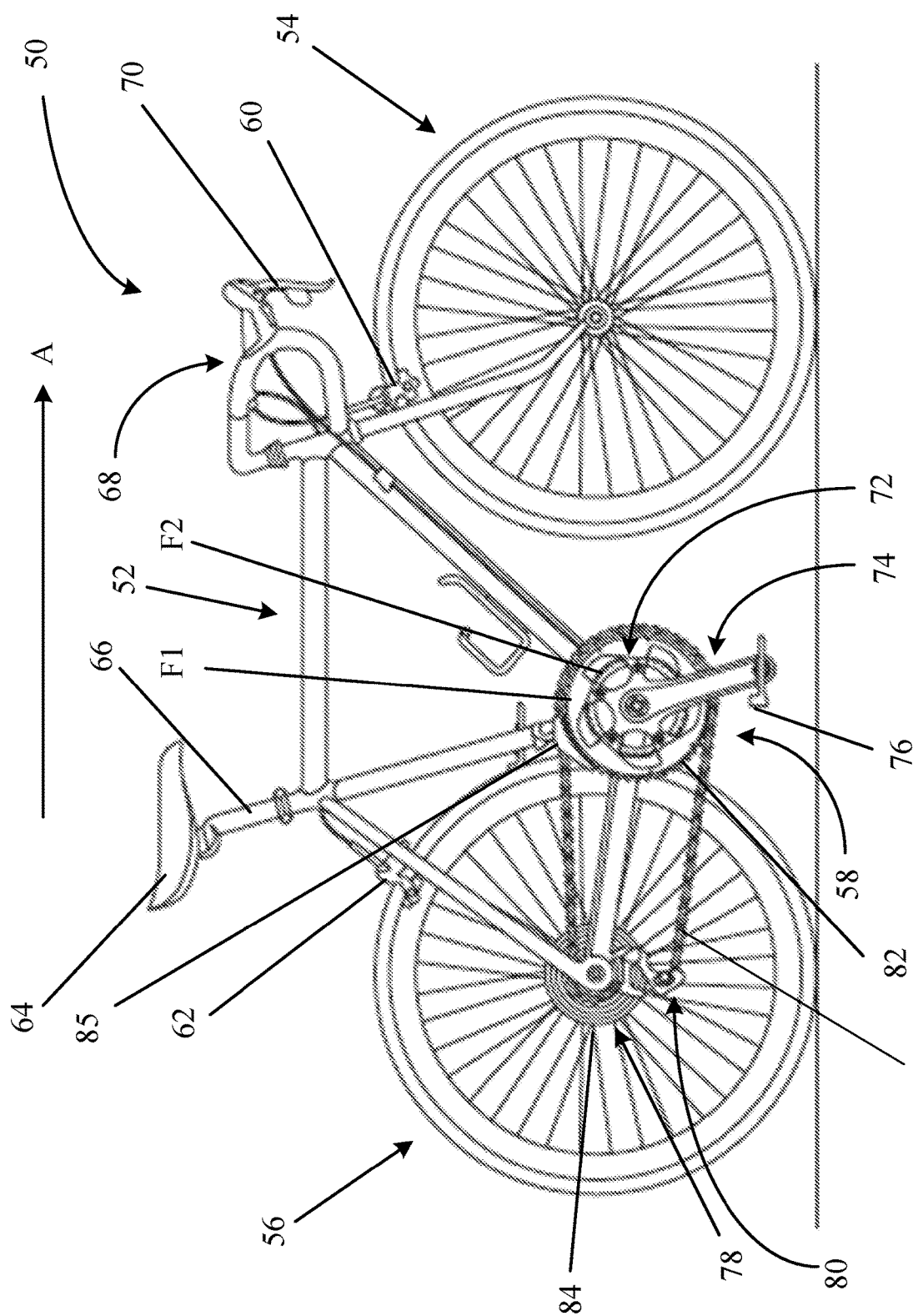
FIG. 1 is a side view schematic of a bicycle that may be constructed to utilize a damper on the rear derailleur.

The present disclosure provides examples of friction dampers and bicycle rear derailleurs that solve or improve upon one or more of the above-noted and/or other disadvantages with prior known dampers and derailleurs. The disclosed friction dampers eliminate the need to include roller clutches in the damper. The friction damper restricts derailleur chain tensioner movement in a forward chain tensioner rotational direction and helps control a chain oscillatory amplitude (e.g., a vertical chain amplitude) of a lower half of the chain when the bicycle is subject to ground input (e.g., vertical ground input). A significant advantage of the disclosed friction dampers is that damping forces are higher when the derailleur chain tensioner is rotated in the forward chain tensioner rotational direction compared to the backward chain tensioner rotational direction. The higher damping forces in the forward chain tensioner rotational direction help limit the chain amplitude, while the lower damping forces in the backward chain tensioner rotational direction allow a return spring (e.g., a P-spring) to act on the derailleur chain tensioner and maintain chain tension without a large increase or any increase in size of the return spring. Another advantage of the disclosed friction dampers is that the damper is lighter than a traditional roller clutch based friction type damper. Yet another advantage of the disclosed dampers is the ease of manufacturing the dampers and the ease of installation within the rear derailleur.

Examples of friction dampers and bicycle rear derailleurs that employ such friction dampers are disclosed and described herein. The disclosed dampers resist chain tensioner motion in the chain slackening direction of chain tensioner rotation more than in the chain tensioning direction. In other words, the torque generated by the friction damper when the derailleur chain tensioner rotates in the chain slackening direction is greater than the torque generated by the damper when the derailleur chain tensioner rotates in the chain tensioning direction. As a result, damping torque applied by the disclosed dampers is low when a rider is shifting gears, and is high during, for example, an impact or vibration event.

The disclosed friction dampers can reduce the weight of a rear derailleur equipped with such a damper, compared to a rear derailleur equipped with a prior art roller clutch damper. For example, the simple and minimal part design of the disclosed friction dampers weighs less in comparison to, for example, a roller clutch based damped equivalent that includes multiple assembled components. The disclosed friction dampers can also be relatively small and may be cylindrical in shape, which, when mounted on a rear derailleur, may reduce the overall size of the rear derailleur or chain tensioner.

These and other objects, features, and advantages of the disclosed friction dampers will become apparent to those having ordinary skill in the art upon reading this disclosure. Throughout the drawing figures, where like reference numbers are used, the like reference numbers represent the same or substantially similar parts among the various disclosed examples. Also, specific examples are disclosed and described herein that utilize specific combinations of the disclosed aspects, features, and components of the disclosure. However, it is possible that each disclosed aspect, feature, and/or component of the disclosure may, in other examples not disclosed or described herein, be used independent of or in different combinations with other of the aspects, features, and components of the disclosure.

Turning now to the drawings, FIG. 1 generally illustrates a bicycle 50 that employs a rear derailleur and a damper constructed in accordance with the teachings of the present disclosure. The bicycle 50 includes a frame 52, a front wheel 54 and a rear wheel 56 each rotatably attached to the frame 52, and a drivetrain 58. A front brake 60 is provided for braking the front wheel 54 and a rear brake 62 is provided for braking the rear wheel 56. The bicycle 50 also generally has a seat 64 near a rear end of the frame 52 and carried on an end of a seat tube 66 connected to the frame 52. The bicycle 50 also has handlebars 68 near a forward end of the frame 52. A brake lever 70 is carried on the handlebars 68 for actuating one of the front brake 60 or rear brake 62, or both. If the brake lever 70 actuates only one of the front brake 60 and the rear brake 62, a second brake lever (not shown) may also be provided to actuate the other brake. A front and/or forward riding direction or orientation of the bicycle 50 is indicated by the direction of the arrow A in FIG. 1. As such, a forward direction for the bicycle 50 is indicated by the direction of arrow A.

While the illustrated bicycle 50 depicted in FIG. 1 is a road bike having drop-style handlebars 68, the present disclosure may be applicable to bicycles of any type, including mountain bikes with full or partial suspension, as well as bicycles with mechanically controlled (e.g. cable, hydraulic, pneumatic) and non-mechanical controlled (e.g. wired, wireless) drive systems.

The drivetrain 58 has a chain C and a front sprocket assembly 72, which is coaxially mounted with a crank assembly 74 having pedals 76. The drivetrain 58 also includes a rear sprocket assembly 78 coaxially mounted with the rear wheel 56 and a rear gear change mechanism, such as a rear derailleur 80.

Figure 2:
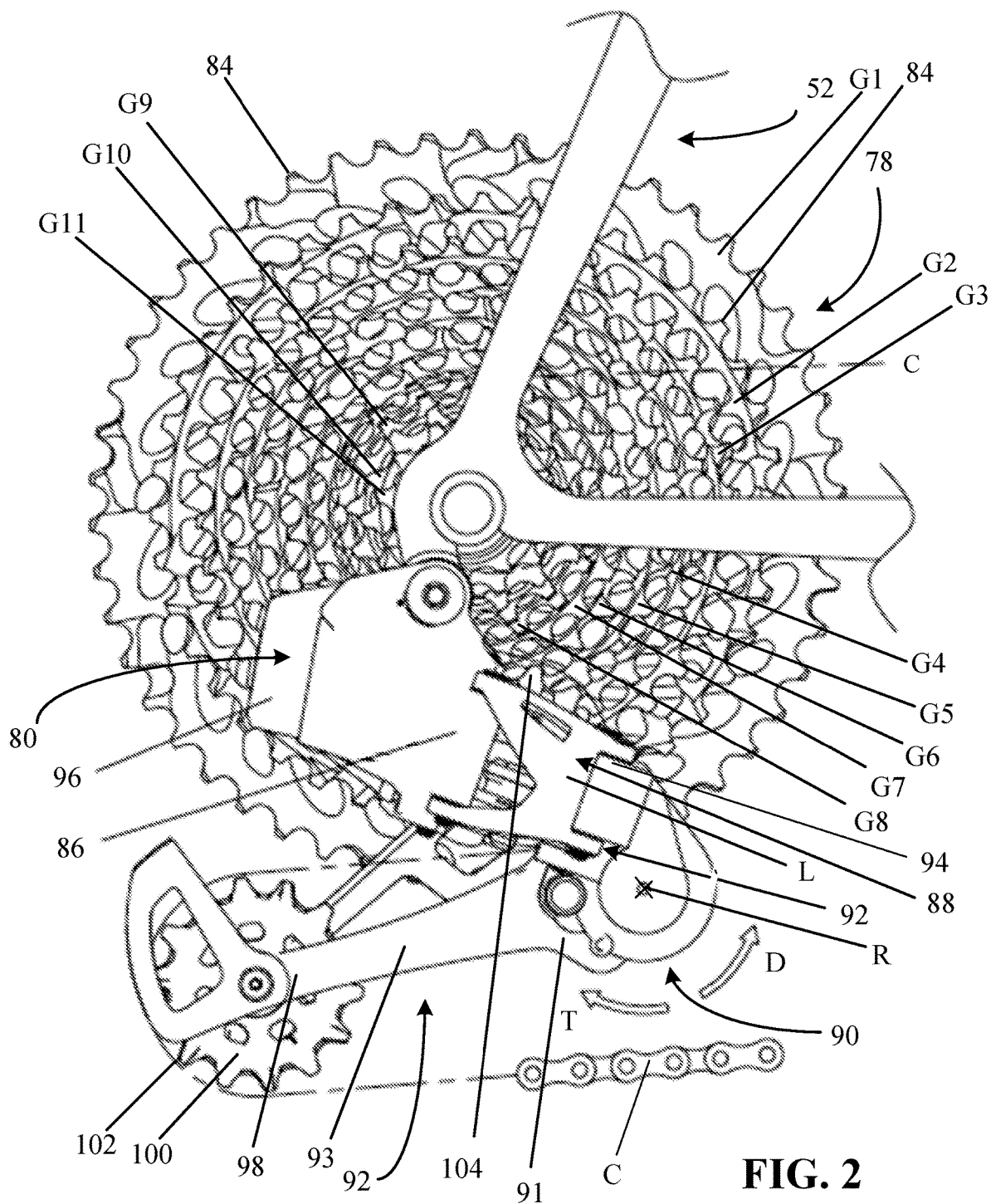
FIG. 2 is a close-up side view of one example of an electronic rear derailleur mounted to a bicycle.

As is illustrated in FIG. 1, the front sprocket assembly 72 may include one or more coaxially mounted chain rings, gears, or sprockets. In this example, the front sprocket assembly 72 has two such sprockets, F1 and F2, each having teeth 82 around a respective circumference. As shown in FIGS. 1 and 2, the rear sprocket assembly 78 may include a plurality (e.g., eleven) of coaxially mounted gears, cogs, or sprockets G1-G11. Each sprocket G1-G11 also has teeth 84 arranged around a respective circumference. The number of teeth 82 on the smaller diameter front sprocket F2 may be less than the number of teeth on the larger diameter sprocket F1. The numbers of teeth 84 on the rear sprockets G1-G11 may gradually decrease from the largest diameter rear sprocket G1 to the smallest diameter sprocket G11. Though not described in any detail herein, a front gear changer 85 may be operated to move from a first operating position to a second operating position to move the chain C between the front sprockets F1 and F2. Likewise, the rear derailleur 80 may be operable to move between eleven different operating positions to switch the chain C to a selected one of the rear sprockets G1-G11.

Figure 3:
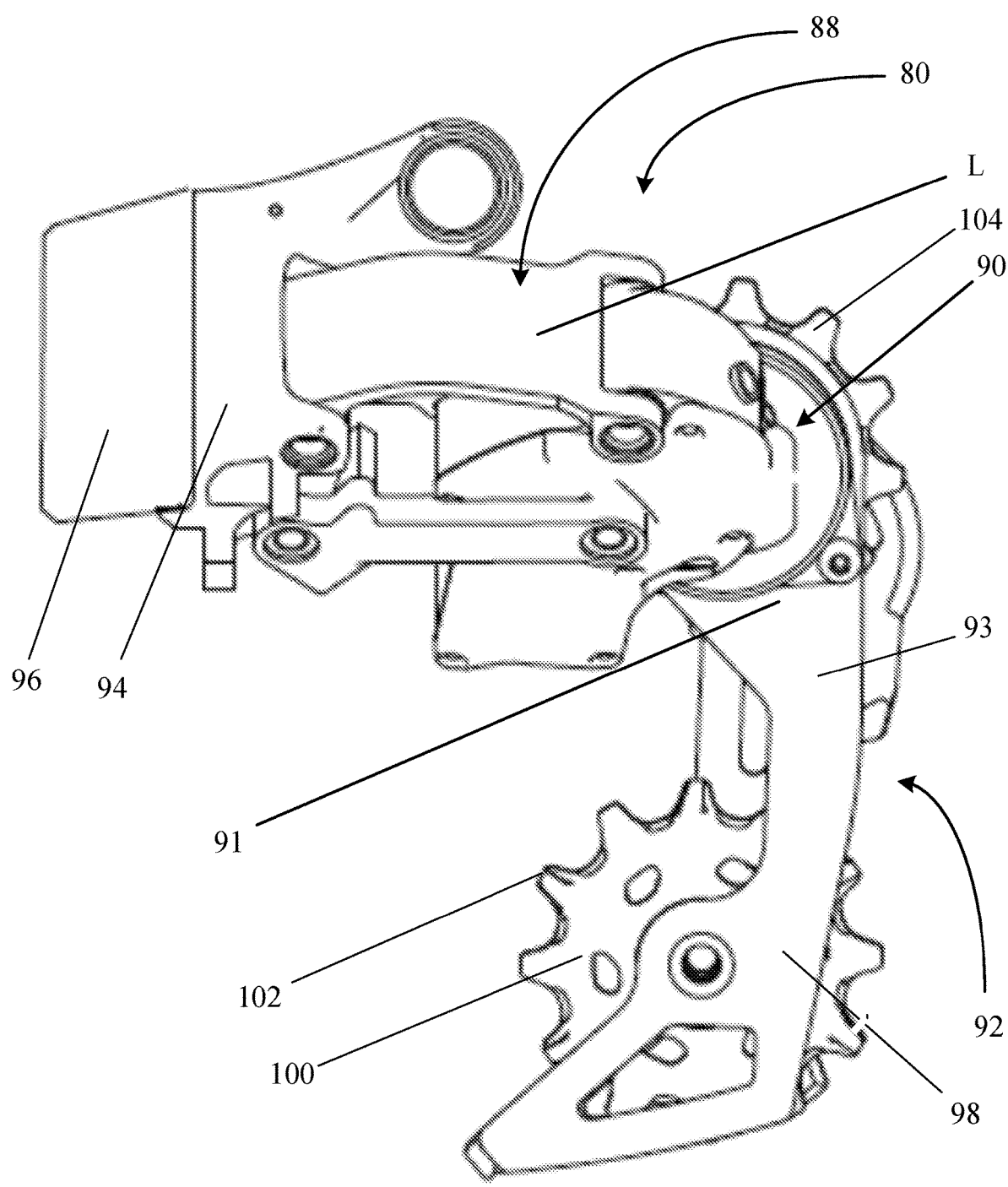
FIG. 3 is a close-up side view of another example of an electronic rear derailleur, removed from a bicycle.

Referring to FIGS. 2 and 3, the rear derailleur 80 is depicted in these examples as a wireless, electrically actuated rear derailleur mounted to the frame 52 of the bicycle 50. The electric rear derailleur 80 has a base member 86 (e.g., a b-knuckle) that is mounted to the bicycle frame 52. A linkage 88 has two links L (one is hidden behind the other in FIG. 2) that are pivotally connected to the base member 86. A movable member 90 (e.g., a p-knuckle) is connected to the linkage 88. A chain guide assembly 92 (e.g., a cage) has a cage plate 93 with a proximal end 91 that is pivotally connected to a part of the movable member 90, as described further below. The cage plate 93 may rotate or pivot about a cage rotation axis R in a damping direction D and a chain tensioning direction T.

A motor module 94 is carried on the electric rear derailleur 80 and has a battery 96. The battery 96 supplies power to the motor module 94. In one example, as illustrated in FIG. 2, the motor module 94 is located in the base member 86. However, the motor module 94 may instead be located elsewhere, such as in one of the links L of the linkage 88 or in the movable member 90, as illustrated in FIG. 3. The motor module 94 may include, though not shown herein, a gear mechanism or transmission. As is known in the art, the motor module 94 and gear mechanism may be coupled with the linkage 88 to laterally move the cage plate 93 and thus switch the chain C among the rear sprockets G1-G11 on the rear sprocket assembly 78.

The cage plate 93 also has a distal end 98 that carries a tensioner cog or wheel 100. The wheel 100 also has teeth 102 around a circumference. The cage plate 93 is biased in the chain tensioning direction T to maintain tension in the chain C. The chain guide assembly 92 may also include a second cog or wheel, such as a guide wheel 104 disposed nearer the proximal end of the cage plate 93 and the movable member 90. In operation, the chain C is routed around one of the rear sprockets G1-G11. An upper segment of the chain C extends forward to the front sprocket assembly 72 and is routed around one of the front sprockets F1 or F2. A lower segment of the chain C returns from the front sprocket assembly 72 to the tensioner wheel 100 and is then routed forward to the guide wheel 104. The guide wheel 104 directs the chain C to the rear sprockets G1-G11. Lateral movement of the cage plate 93, tensioner wheel 100, and guide wheel 104 may determine the lateral position of the chain C for alignment with a selected one of the rear sprockets G1-G11.

Though not shown herein, a control unit may be mounted to the handlebars 68 for actuating the motor module 94 and operating the rear derailleur 80 for executing gear changes and gear selection. The control unit, however, may be located anywhere on the bicycle 50 or, alternatively, may be distributed among various components of the bicycle 50, with routing of a communication link to accommodate necessary signal and power paths. The control unit may also be located other than on the bicycle 50, such as, for example, on a rider's wrist or in a jersey pocket. The communication link may include wires, may be wireless, or may be a combination thereof. In one example, the control unit may be integrated with the rear derailleur 80 to communicate control commands between components. The control unit may include a processor, a memory, and one or more communication interfaces.

The battery 96 may instead be an alternate power supply or power source and may operate other electric components of the bicycle 50 within a linked system. The battery 96 or other power supply may also be located in other positions, such as attached to the frame 52. Further, multiple power supplies may be provided, which may collectively or individually power the electric components of the system, including the rear derailleur 80, such as a drive motor for an embodiment involving an electrically powered bicycle. In this example, however, the battery 96 is configured to be attached directly to the rear derailleur 80, and to provide power only to the components of the rear derailleur 80.

Figure 4:
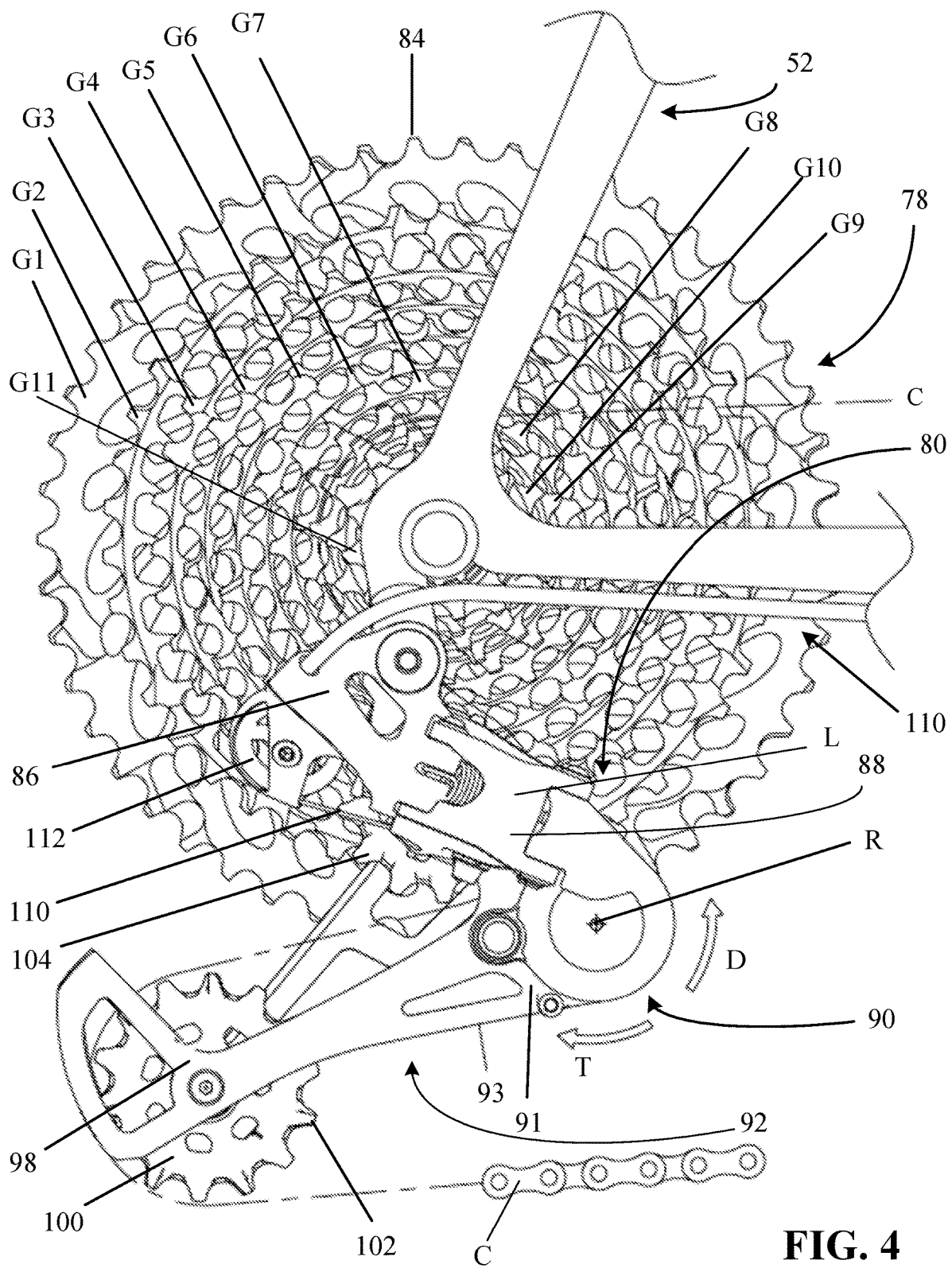
FIG. 4 is a close-up side view of one example of a manually actuated rear derailleur mounted to a bicycle.

Referring to FIG. 4, a cable actuated or manual rear derailleur 80 is shown mounted to the frame 52 of the bicycle 50. The manual rear derailleur 80 is substantially the same as the electric rear derailleur and operates in a similar manner, as described above, except for the difference noted below. Thus, the manual rear derailleur 80 includes the base member 86 mounted to the bicycle frame 52. The linkage 88, including the two links L, is pivotally connected to the base member 86. The movable member 90 is connected to the links L of the linkage 88. The cage plate 93 is pivotally connected to the movable member 90 and is rotatable about the cage rotation axis R in a damping direction D and a chain tensioning direction T. In this example, an actuator cable 110 is connected to a gear shifter (not shown) that is carried on the handlebars 68 or another part of the bicycle 50. The actuator cable 110 is routed around a cable guide wheel 112 carried by the base member 86 and is coupled to the linkage 88. A rider operates the gear shifter to move the linkage laterally to shift the chain C among the rear sprockets G1-G11, as is known in the art.

The movable member 90 houses a damper device 120, hereinafter identified as the "damper 120" to simplify the description. A first example of the damper 120 is now described referring to FIGS. 5-7. Though discussed herein as a part of a rear derailleur of a bicycle, the damper 120 may be incorporated onto a chain tensioner or chain guide assembly of a bicycle, where the chain tensioner is not a part of a front or rear derailleur.

Figure 5:
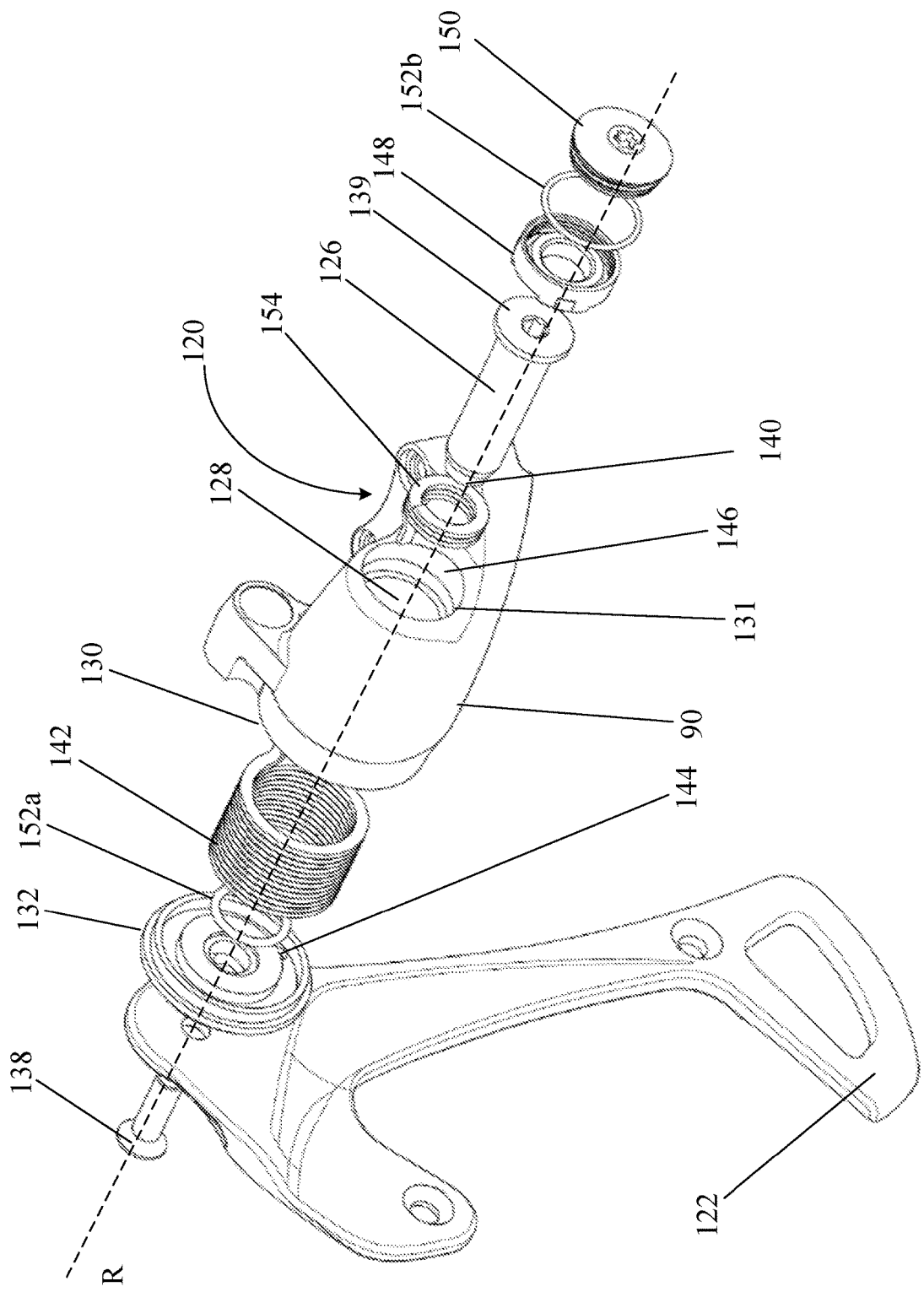
FIG. 5 is an exploded perspective view of a portion of one example of a rear derailleur, including a first damper in accordance with the teachings of the present disclosure.

Referring to FIG. 5, the chain guide assembly 92 includes an outer plate 122 and an inner plate (not shown), spaced apart. The outer plate 122 and the inner plate are, for example, rigid plates. A tensioner wheel and the guide wheel (not shown) may be rotatably arranged between the outer plate 122 and the inner plate for receiving the chain (not shown). For example, the tensioner wheel and the guide wheel are rotatable relative to the outer plate 122 and the inner plate of the chain guide assembly 92 via corresponding bearings (not shown), respectively, with which the tensioner wheel and the guide wheel rotate. The outer plate 122 is connected in a rotatably fixed manner with a rotational shaft 126. The rotational shaft 126 is supported for rotation in a cavity 128 of the movable member 90. The cavity 128 may form a passage (e.g., a stepped passage bore) extending from a first axial side 130 of the movable member 90 to a second axial side 131 of the movable member 90 that is opposite the first axial side 130.

An intermediate member 132 (e.g., an intermediate washer) is located between the outer plate 122 and the movable member 90. The intermediate member 132 is connected to the outer plate 122 in a rotatably fixed manner by, for example, the rotational shaft 126 and a screw and/or protrusions that engage in openings in the outer plate 122. In one example, the outer plate 122 and the intermediate member 132 are formed as a single contiguous part.

The outer plate 122 and the intermediate member 132 are rotatably connected to the movable member 90 via the rotational shaft 126 and a screw 138. The screw 138 is, for example, screwed into an inner thread of the rotational shaft 126, such that the outer plate 122 and the intermediate member 132 are rotationally fixed relative to the rotational shaft 126. The rotational shaft 126 projects from the second axial side 131 of the movable member 90, through the cavity 128 of the movable member 90, and towards the first axial side 130 of the movable member 90. A first end 139 of the rotational shaft 126 is positioned within the cavity 128 of the movable member 90 at or adjacent to the second axial side 131 of the movable member 90, and a second end 140 of the rotational shaft 126 is positioned at or adjacent to the first axial side 130 of the movable member 90. The screw 138 engages with the rotational shaft 126 at and/or adjacent to the second end 140 of the rotational shaft 126.

A biasing device 142 engages with a coupling portion in a positive-locking manner in the movable member 90 and with a coupling portion at 144 in a positive-locking manner in the intermediate member 132 and/or the outer plate 122. The biasing device 142 thus biases the chain guide assembly 92 in the chain tensioning direction T to maintain or restore the necessary tensioning of the chain, which is engaged with the tensioner wheel and the guide wheel. The biasing device 142 may be any number of different types of biasing devices including, for example, a torsion spring.

The cavity 128 of the movable member 90, at the second axial side 131, includes a first recess 146 in which a screw element 148 is positionable. The screw element 148 closes off the cavity 128 at the second axial side 131 of the movable member 90. The screw element 148 is positionally fixed relative to the movable member 90 when installed within the movable member 90. The screw element 148 may be positionally fixed relative to the movable member 90 in any number of ways including, for example, with a friction fit, an adhesive, tabs, flanges, other connectors, or any combination thereof. In one example, the screw element 148 is screwed into an inner thread (not shown) at the second axial side 131 of the movable member 90.

When the rear derailleur 80 is assembled, a cover cap 150 is attached to the screw element 148. The cover cap 150 is attached to the screw element 146 in any number of ways including, for example, with threads (e.g., inner threads) of the screw element 148 and threads (e.g., outer threads) of the cover cap 150, an adhesive, tabs, flanges, other connectors, or any combination thereof. The cover cap 150 prevents access to components within the movable member 90 such as, for example, the damper 120 and the rotational shaft 126 without a corresponding tool. In this way, adjustments of frictional engagement between a portion of the damper 120 and the rotational shaft 126, as compared with factory settings, or calibration and adjustment may be prevented. Setting and calibration of the frictional engagement and securing of the screw element 148 and the cover cap 150 may be performed when the rear derailleur 80 is not yet assembled (e.g., before the movable member 90 is connected to the linkage 88).

Figure 6:
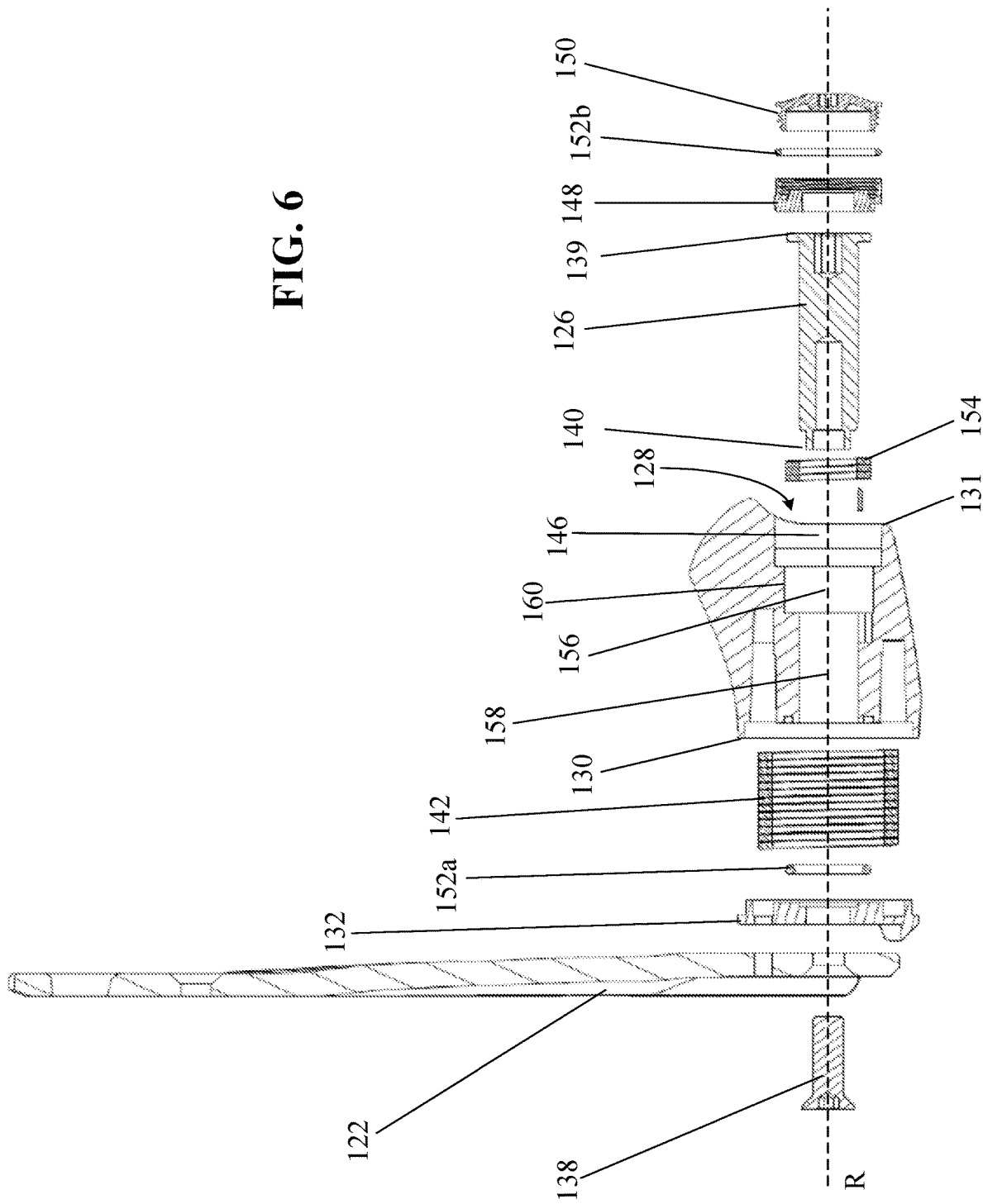
FIG. 6 is an exploded cross-section view taken along a rotation axis of the rear derailleur of FIG. 5.
Figure 7:
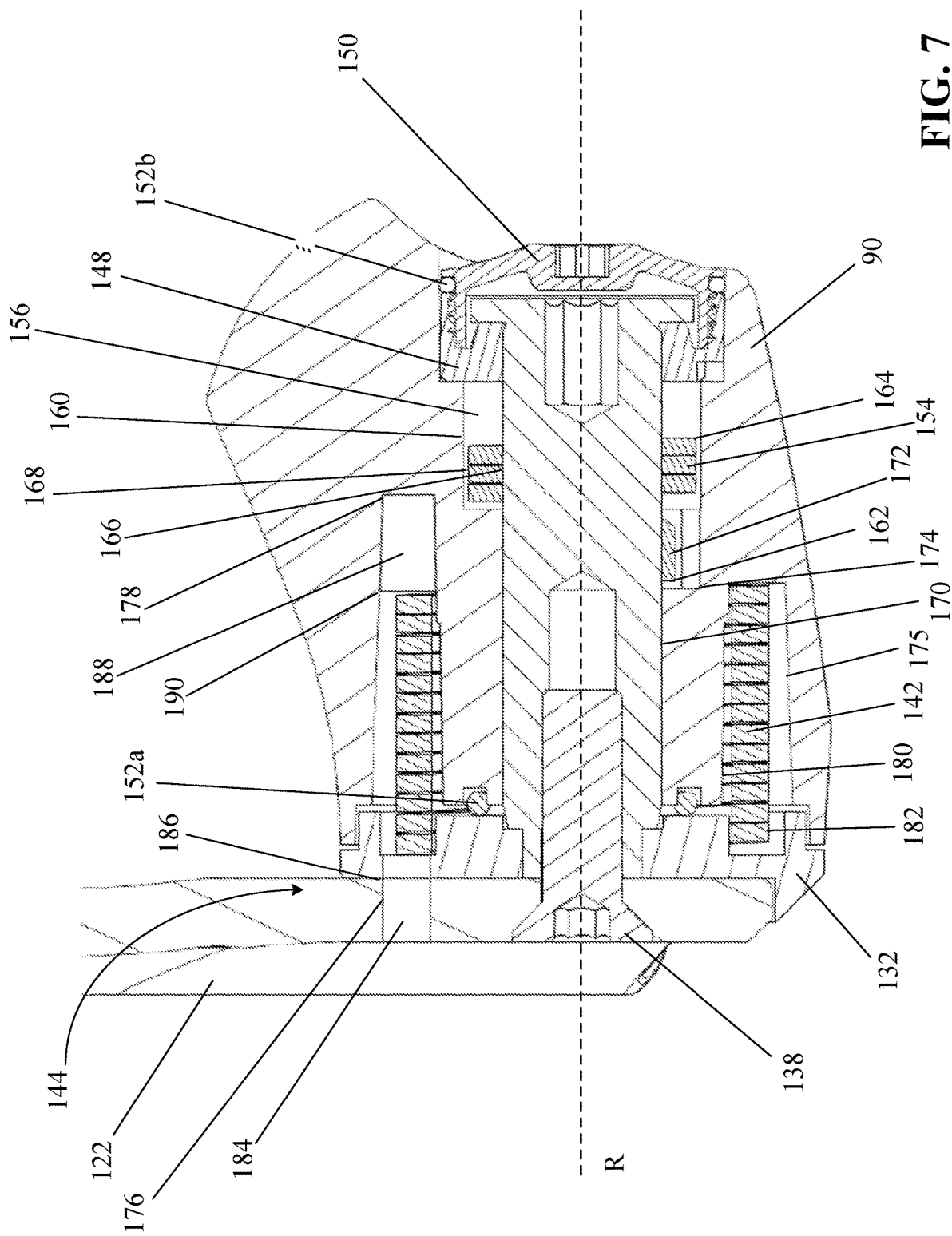
FIG. 7 is a cross-section view taken along the rotation axis of the rear derailleur of FIG. 5, assembled.

In one example, the rear derailleur 80 also includes one or more seal elements 152 that prevent, for example, dirt and moisture from entering the passage within the movable member 90, through which the rotational shaft 126 rotates. For example, as shown in FIGS. 5-7, the rear derailleur 80 includes a first seal element 152a positioned at or adjacent to the first axial side 130 of the movable member 90 and a second seal element 152b positioned at or adjacent to the second axial side 131 of the movable member 90. The first seal element 152a provides a seal between the intermediate member 132 and the movable member 90, and the second seal element 152b provides a seal between the cover cap 150 and the screw element 148 and/or the movable member 90. The first seal element 152a may, for example, be positioned within a ring groove (see FIG. 7) at the first axial side 130 of the movable member 90, and the second seal element 152b may be positioned on an outer circumference of the cover cap 150. More, fewer, and/or different seal elements may be used. For example, a seal element may be positioned between the movable member 90 and the screw element 148. In an embodiment, the seal elements 152 are O-rings made of any number of materials including, for example, Silicone. In another embodiment, the seal element 152 may be a lip seal, box seal, or other type of seal.

In accordance with the teachings of the present disclosure, the damper 120 is disposed within the movable member 90, about the rotational shaft 126. The damper 120 is operable to apply a damping force to the rotational shaft 126, and thus the chain guide assembly 92, when the chain guide assembly, and thus the rotational shaft 126, rotates in the damping direction D.

The damper 120 includes a friction member 154 (e.g., an annular friction member). In one example, the friction member 154 is a spring (e.g., a torsion wrap spring) having a plurality of coils. For example, the spring 154 may have three to five or more coils. The friction member 154 is radially outer relative to the rotational shaft 126 and radially inner relative to the biasing device 142. In the example shown in FIGS. 5-7, once the rear derailleur is assembled, the friction member 154 is biased against and in frictional engagement with the rotational shaft 126.

As shown in FIGS. 6 and 7, the cavity 128 includes a second recess 156 adjacent to the first recess 146. The second recess 156 is, for example, cylindrical in shape. In the example shown in FIGS. 6 and 7, the second recess 156 has a smaller diameter than the first recess 146 but a larger diameter than a through bore 158 through which the rotational shaft 126 extends. The second recess 156 may be any number of sizes. In one example, the second recess 156 has a diameter approximately equal to an outer diameter of the friction member 154, but when the friction member 154 is positioned within the second recess 156, the friction member 154 is not in physical contact with a wall 160 of the movable member 90 defining the second recess 156. A length of the second recess 156 may be larger than a length of the friction member 154 when the friction member 154 is unloaded. The larger length of the second recess 156 allows the length of the friction member 154 to increase during frictional engagement of the friction member 154 with the rotational shaft 126 as the rotational shaft 126 rotates.

As shown in FIG. 7, the friction member 154 has a first end 162, a second end 164, an inner annular surface 166, and an outer annular surface 168. The friction member 154 is positioned within the second recess 156 of the cavity 128 of the movable member 90, and at least a portion of the inner annular surface 166 of the friction member 154 is in frictional engagement with (e.g., in physical contact with, abuts) an outer annular surface 170 of the rotational shaft 126.

The first end 162 of the friction member 154 is non-rotatably attached to the movable member 90, while the second end 164 of the friction member 154 is free to move relative to the movable member 90. For example, the second end 164 of the friction member 154 is a circumferentially free end. The term "non-rotatably attached" includes attachment of the friction member 154 to the movable member 90 allowing backlash or play between the first end 162 of the friction member 154 and the movable member 90 (e.g., due to gaps at the connection between the first end 162 of the friction member 154 and walls defining a recess of the movable member 90).

The first end 162 of the friction member 154 engages with a coupling portion of the movable member 90 in a positive-locking manner. In one example, the first end 162 of the friction member 154 forms a tab 172 that is insertable into a corresponding recess 174 within the movable member 90. The recess 174 may be adjacent to the second recess 156 and may be sized and shaped to match the size and shape of the tab 172. Additionally or alternatively, the first end 162 of the friction member 154 may be non-rotatably attached to the movable member 90 in other ways. For example, the first end 162 of the friction member 154 may be non-rotatably attached to the movable member 90 with an adhesive, flanges, other tabs, other connectors, or any combination thereof.

In one example, the friction member 154 is made of a first material, and the rotational shaft 126 is made of a second material that is different than the first material. The first material and the second material may be any number of materials. For example, the first material is a high carbon steel that is heat treated and spring tempered (e.g., 1080 carbon steel), and the second material is hardened steel (e.g., 4140 alloy steel). Other materials may be used. In one example, the second material has a greater hardness than the first material, such that the friction member 154 fails before the rotational shaft 126, as the friction member 154 may be easier and less expensive to replace than the rotational shaft 126. The first material and/or the second material may be a different material.

Referring to FIGS. 6 and 7, when the rear derailleur 80 is assembled, the friction member 154 is positioned within the second recess 156 of the movable member 90, closer to the second axial side 131 than the first axial side 130 of the movable member 90. The friction member 154 is positioned around and biased against the rotational shaft 126 such that at least a portion of the inner annular surface 166 of the friction member 154 is in physical contact and frictional engagement with a portion of the outer annular surface 170 of the rotational shaft 126. In one example, at least a portion of the inner annular surface 166 of the friction member 154 is always in physical contact and frictional engagement with a portion of the outer annular surface 170 of the rotational shaft 126.

The friction member 154 is sized and shaped such that the friction member 154 is in physical contact (e.g., frictional engagement) with the outer annular surface 170 of the rotational shaft 126 but not the wall 160 of the movable member 90 forming the second recess 156. The inner diameter of the friction member 154 may be set such that a portion of the inner annular surface 166 of the friction member 154 abuts the outer annular surface 170 of the rotational shaft 126 in an unloaded state of the friction member 154 when the rear derailleur 80 is assembled, but the friction member 154 may still be arranged on the rotational shaft 126 (e.g., with an interference fit) during manufacturing of the rear derailleur 80. The length of the friction member 154 may be set such that during a maximum loading of the friction member 154 (e.g., at a maximum rotation of the chain guide assembly 92 and the rotational shaft 126 in the damping direction D), the friction member 154 does not physically contact the screw element 148 (e.g., due to the length of the friction member 154 increasing during loading). The size (e.g., the inner diameter and/or the length) of the friction member 154 is scalable to increase or decrease frictional forces between the friction member 154 and the rotational shaft 126 during operation of the rear derailleur 80.

Again referring to FIGS. 6 and 7, the biasing device 142 is positionable within a third recess 175 that extends from the first axial side 130 of the movable member 90, into the movable member 90. The biasing device 142 has a first end 176, a second end 178, an inner annular surface 180, and an outer annular surface 182. In one example, the biasing device 142 is sized and shaped such that the biasing device 142 is positionable within the third recess 175, but the inner annular surface 180 and the outer annular surface 182 of the biasing device 142 are not in physical contact with the movable member 90.

The first end 176 of the biasing device 142 is non-rotatably attached to the intermediate member 132 and/or the outer plate 122 at the coupling portion 144, and the second end 178 of the biasing device 142 is non-rotatably attached to the movable member 90. In one example, the first end 176 of the biasing device 142 forms a tab 184 that is insertable into an opening 186 extending through the intermediate member 132 and/or the outer plate 122 at the coupling portion 144, and the second end 178 of the biasing device 142 forms a tab 188 that is insertable into a recess 190 within the movable member 90. The recess 190 may be adjacent to the third recess 175 and may be sized and shaped to match the size and shape of the tab 188. Additionally or alternatively, the first end 176 of the biasing device 142 may be non-rotatably attached to the intermediate member 132 and/or the outer plate 122 and/or the second end 178 of the biasing device 142 may be non-rotatably attached to the movable member 90 in other ways. For example, the first end 176 of the biasing device 142 may be non-rotatably attached to the intermediate member 132 and/or the outer plate 122, and/or the second end 178 of the biasing device 142 may be non-rotatably attached to the movable member 90 with an adhesive, flanges, other tabs, other connectors, or any combination thereof.

The frictional engagement between the inner annular surface 166 of the friction member 154 and the outer annular surface 170 of the rotational shaft 126 restricts rotational motion of the chain guide assembly 92 relative to the movable member 90, thus the friction member 154 may act as a form of a spring clutch. When the chain guide assembly 92 and the rotational shaft 126 rotate in the damping direction D, with the first end 162 of the friction member 154 non-rotatably attached to the movable member 90 and the second end 164 of the friction member 154 being free to move, the frictional engagement between the friction member 154 and the rotational shaft 126 causes the inner diameter of the friction member 154 to get smaller and the length of the friction member 154 to get longer. When the chain guide assembly 92 and the rotational shaft 126 rotate in the tensioning direction T, the frictional engagement between the friction member 154 and the rotational shaft 126 causes the inner diameter of the friction member 154 to get larger and the length of the friction member 154 to get shorter.

The friction member 154 applies a radial spring force to the rotational shaft 126 as the chain guide assembly 92, and thus the rotational shaft 126, rotates in the damping direction D relative to the movable member 90 from, for example, a first rotational position to a second rotational position. The radial spring force is greater when the chain guide assembly 92, and thus the rotational shaft 126, is in the second rotational position compared to when the chain guide assembly 92, and thus the rotational shaft 126, is in the first rotational position. The friction member 154 creates a higher torque on the rotational shaft 126 when the chain guide assembly 92 and the rotational shaft 126 rotate in the damping direction D compared to when the chain guide assembly 92 and the rotational shaft 126 rotate in the tensioning direction T. Different ratios of torques created by the friction member 154 on the rotational shaft 126 when the chain guide assembly 92 and the rotational shaft 126 rotate in the damping direction D compared to when the chain guide assembly 92 and the rotational shaft 126 rotate in the tensioning direction T, respectively, may be provided based on different sizes, shapes, and/or materials of the friction member 154 and/or the rotational shaft 126. In other examples, any number of surface finishes may be provided for the rotational shaft 126 and/or the friction member 154, and/or any number of lubricants may be used between the rotational shaft 126 and the friction member 154 to control the torques generated by the friction member 154 on the rotational shaft 126 when the chain guide assembly 92 and the rotational shaft 126 rotate in the damping direction D and when the chain guide assembly 92 and the rotational shaft 126 rotate in the tensioning direction T, respectively.

The chain guide assembly 92, including the outer plate 122 and the intermediate member 132 shown in FIG. 7, rotates together with the rotational shaft 126 in the damping direction D and the tensioning direction T. The biasing device 142 biases the chain guide assembly 92 in the tensioning direction T. As the chain guide assembly 92 rotates in the damping direction D, the biasing device 142 acts on the chain guide assembly 92 to return the chain guide assembly 92 and thus the rotational shaft 126 to a rotational position in which chain tension is maintained. The lower torque created by the friction member 154 in the tensioning direction T compared to the damping direction D allows the biasing device 142 to maintain chain tension without a large increase or any increase in size of the biasing device 142 compared to a rear derailleur without the friction member 154.

Figure 8:
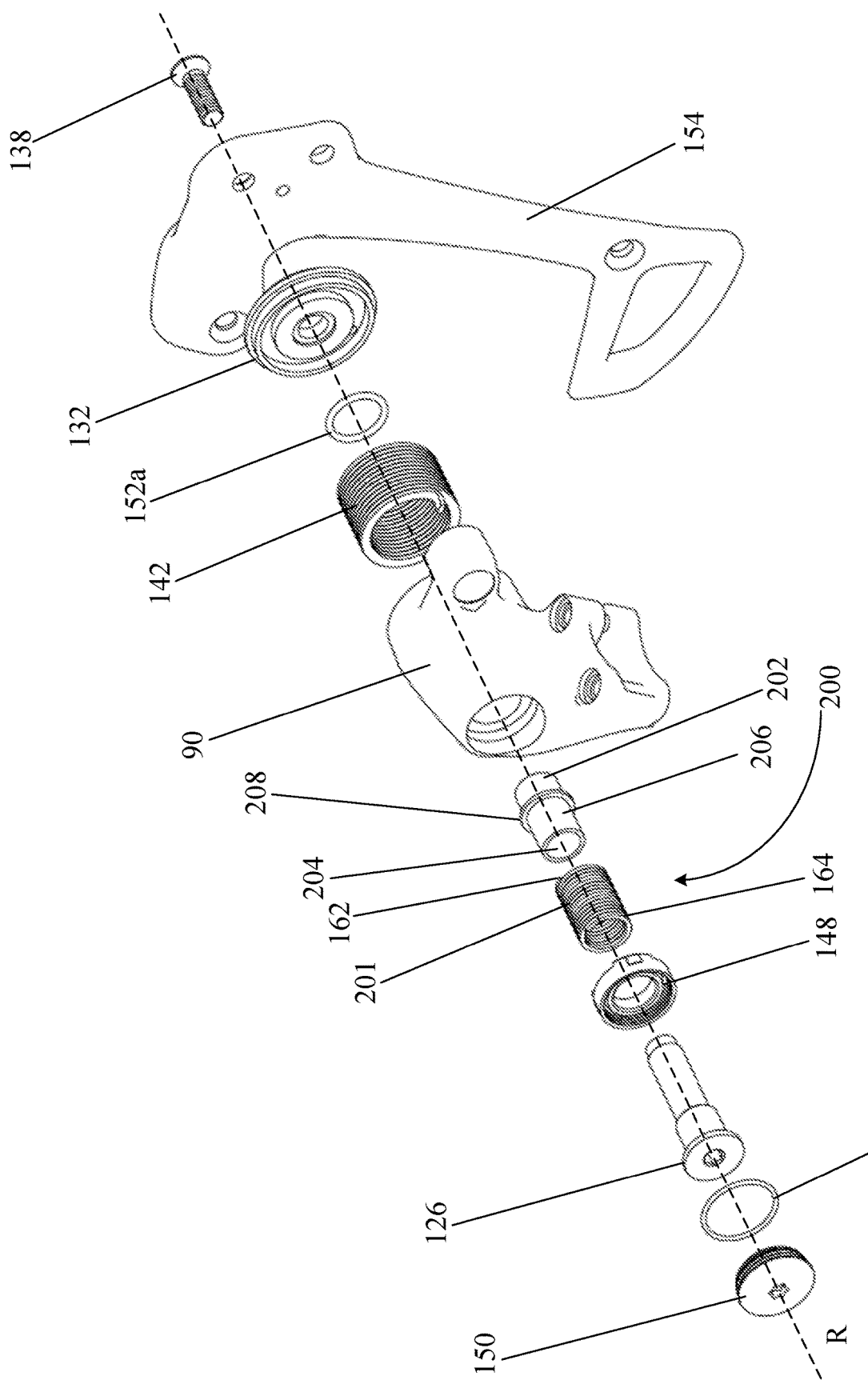
FIG. 8 is an exploded perspective view of a portion of another example of a rear derailleur, including a second damper in accordance with the teachings of the present disclosure.
Figure 9:
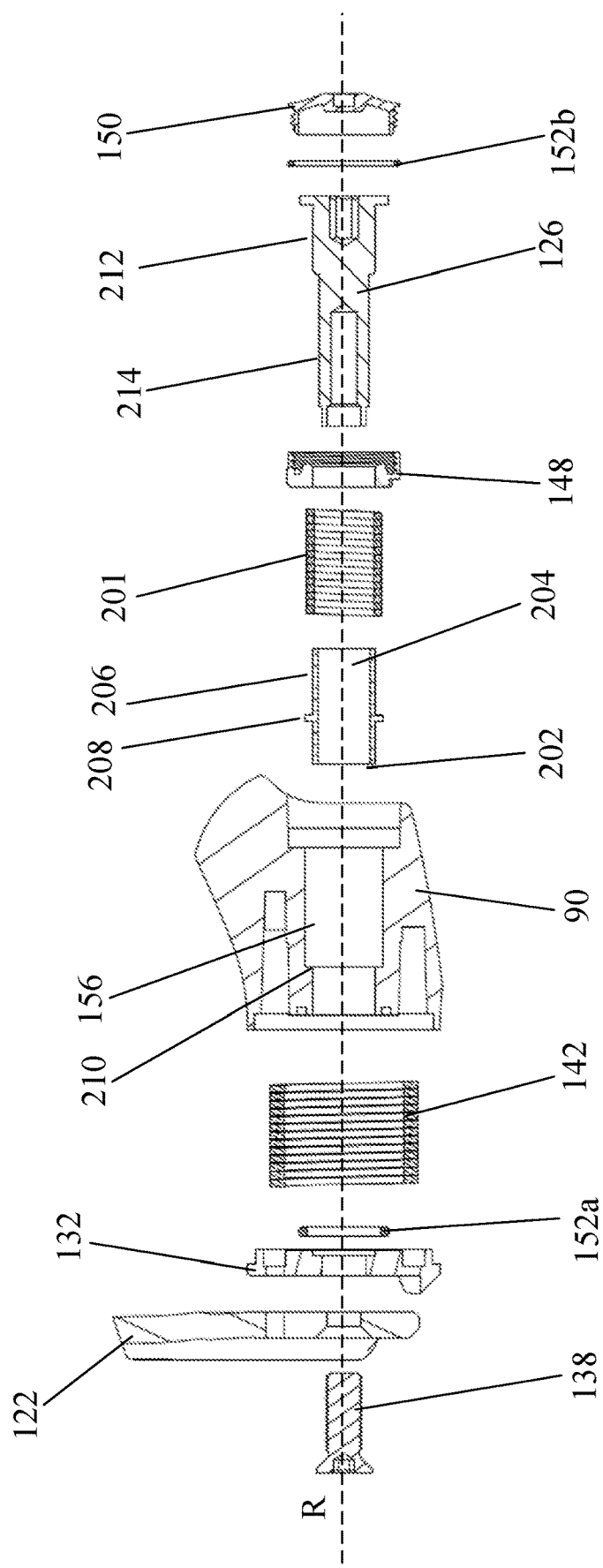
FIG. 9 is an exploded cross-section view taken along a rotation axis of the rear derailleur of FIG. 8.
Figure 10:
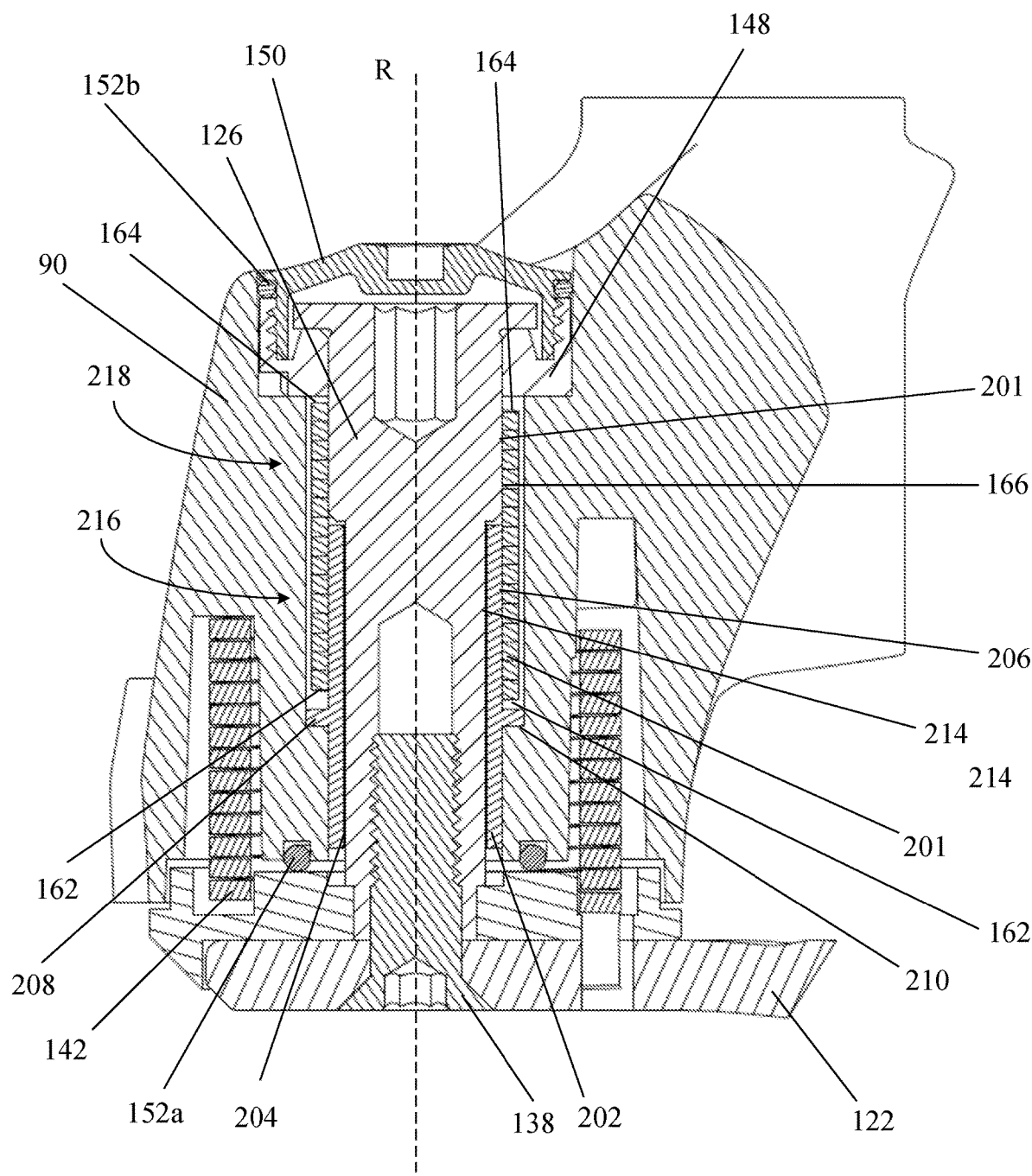
FIG. 10 is a cross-section view taken along the rotation axis of the rear derailleur of FIG. 8, assembled.

A second example of a damper 200 is now described referring to FIGS. 8-10. Though discussed herein as a part of a rear derailleur of a bicycle, the damper 200 may be incorporated onto a chain tensioner or chain guide assembly of a bicycle, where the chain tensioner is not a part of a front or rear derailleur.

The example of the damper 200 shown in FIGS. 8-10, including a friction member 201, differs from the example shown in FIGS. 5-7 in that the first end 162 of the friction member 201 is free to move relative to the movable member 90. Both the first end 162 and the second end 164 of the friction member 201 are free to move relative to the movable member 90. For example, the first end 162 and the second end 164 of the friction member 201 are circumferentially free ends, respectively.

The rear derailleur 80 includes a sleeve 202 that is positionable within the second recess 156 of the movable member 90. In the example shown in FIGS. 8-10, the second recess 156 extends further into the movable member 90 from the second axial side 131 of the movable member 90 compared to the first example shown in FIGS. 5-7. The sleeve 202 includes an inner annular surface 204, an outer annular surface 206, and a flange 208 that extends away from the outer annular surface 206. As shown in FIGS. 9 and 10, the flange 208 is supported by a surface 210 partially defining the second recess 156. The sleeve 202 is positionally fixed relative to the movable member 90. The sleeve 202 may be attached to the movable member 90 in any number of ways including, for example, with an adhesive or another connector.

The rotational shaft 126 is a stepped rotational shaft in that the rotational shaft 126 includes a first outer annular surface 212 and a second outer annular surface 214. The sleeve 202 is positioned about the rotational shaft 126 such that the inner annular surface 204 of the sleeve 202 is adjacent to or abuts the second annular surface 214 of the rotational shaft 126. The rotational shaft 126 rotates within the sleeve 202. The sleeve 202 may be sized such that when the sleeve 202 is positioned on the rotational shaft 126, the outer annular surface 206 of the sleeve 202 is flush with the first annular surface 212 of the rotational shaft 126. In one example, the sleeve 202 is formed as part of the movable member 90. In other words, the sleeve 202 and the movable member 90 form a single contiguous part. Other configurations may be provided.

As shown in FIG. 10, the inner annular surface 166 of the friction member 201 is in physical contact with and biased against the first annular surface 212 of the rotational shaft 126 and a portion of the outer annular surface 206 of the sleeve 202 (e.g., to one side of the flange 208). The sleeve 202 is made of a first material, and the rotational shaft 126 is made of a second material. For example, the sleeve 202 is made of a plastic (e.g., polypropylene, polyethylene, etc.), and the rotational shaft 126 is made of hardened steel (e.g., 4140 alloy steel). Other materials may be used. For example, the sleeve 202 may be made of the same material as the movable member 90. In one example, the second material has a greater hardness than the first material, such that the sleeve 202 fails before the rotational shaft 126, as the sleeve 202 may be easier and less expensive to replace than the rotational shaft 126.

Due to the different materials used for the sleeve 202 and the rotational shaft 126, respectively, the coefficient of static friction and the coefficient of kinetic friction are greater for the frictional engagement between the sleeve 202 and the friction member 201 than the frictional engagement between the first annular surface 212 of the rotational shaft 126 and the friction member 201. Alternatively or additionally, a larger portion (e.g., a greater number of coils) of the friction member 201 may be in frictional engagement with the sleeve 202 than the rotational shaft 126 (e.g., the first annular surface 212 of the rotational shaft 126). The higher coefficients of friction and/or a larger surface of frictional engagement at the sleeve 202 compared to the first annular surface 212 of the rotational shaft 126 provides that a first portion 216 of the friction member 201 in frictional engagement with the sleeve 202 does not rotate relative to the movable member 90 and the sleeve 202 or rotates relative to the movable member 90 and the sleeve 202 less than a second portion 218 of the friction member 201 in frictional engagement with the first annular surface 212 of the rotational shaft 126. The friction member 201 may begin generating a torque on the friction member 201 quicker (e.g., within less angular rotation) than the friction member 154 of the first example shown in FIGS. 5-7 because the friction member 201 does not include a tab that is insertable into a corresponding recess within the movable member 90 to rotatably fix the first end 162 of the friction member 201 relative to the movable member 90, which may allow for play between the tab and one or more surfaces defining the recess.

The friction member 201 may act as a spring clutch. The frictional engagement between the inner annular surface 166 of the friction member 201 and the first annular surface 212 of the rotational shaft 126 restricts rotational motion of the chain guide assembly 92 relative to the movable member 90. When the chain guide assembly 92 and the rotational shaft 126 rotate in the damping direction D, with the second end 164 of the friction member 201 more free to move than the first end 162 of the friction member 201 due to the different coefficients of friction of the first annular surface 212 of the rotational shaft 126 and the sleeve 202, respectively, the frictional engagement between the friction member 201 and the first annular surface 212 of the rotational shaft 126 causes an inner diameter of the friction member 201 to get smaller and the length of the friction member 201 to get longer. When the chain guide assembly 92 and the rotational shaft 126 rotate in the tensioning direction T, the frictional engagement between the friction member 201 and the first annular surface 212 of the rotational shaft 126 causes the friction member 201 to tighten on the rotational shaft 126, thus increasing the radial force on the rotational shaft 126.

The friction member 201 thus creates a higher torque on the rotational shaft 126 when the chain guide assembly 92 and the rotational shaft 126 rotate in the damping direction D compared to when the chain guide assembly 92 and the rotational shaft 126 rotate in the tensioning direction T. Different ratios of torques created by the friction member 201 on the rotational shaft 126 when the chain guide assembly 92 and the rotational shaft 126 rotate in the damping direction D compared to when the chain guide assembly 92 and the rotational shaft 126 rotate in the tensioning direction T, respectively, may be provided based on different sizes, shapes, and/or materials of the friction member 201, the sleeve 202, and/or the rotational shaft 126, and/or different positioning of the friction member 201 along the rotational shaft 126 and the sleeve 202.

Figure 11:
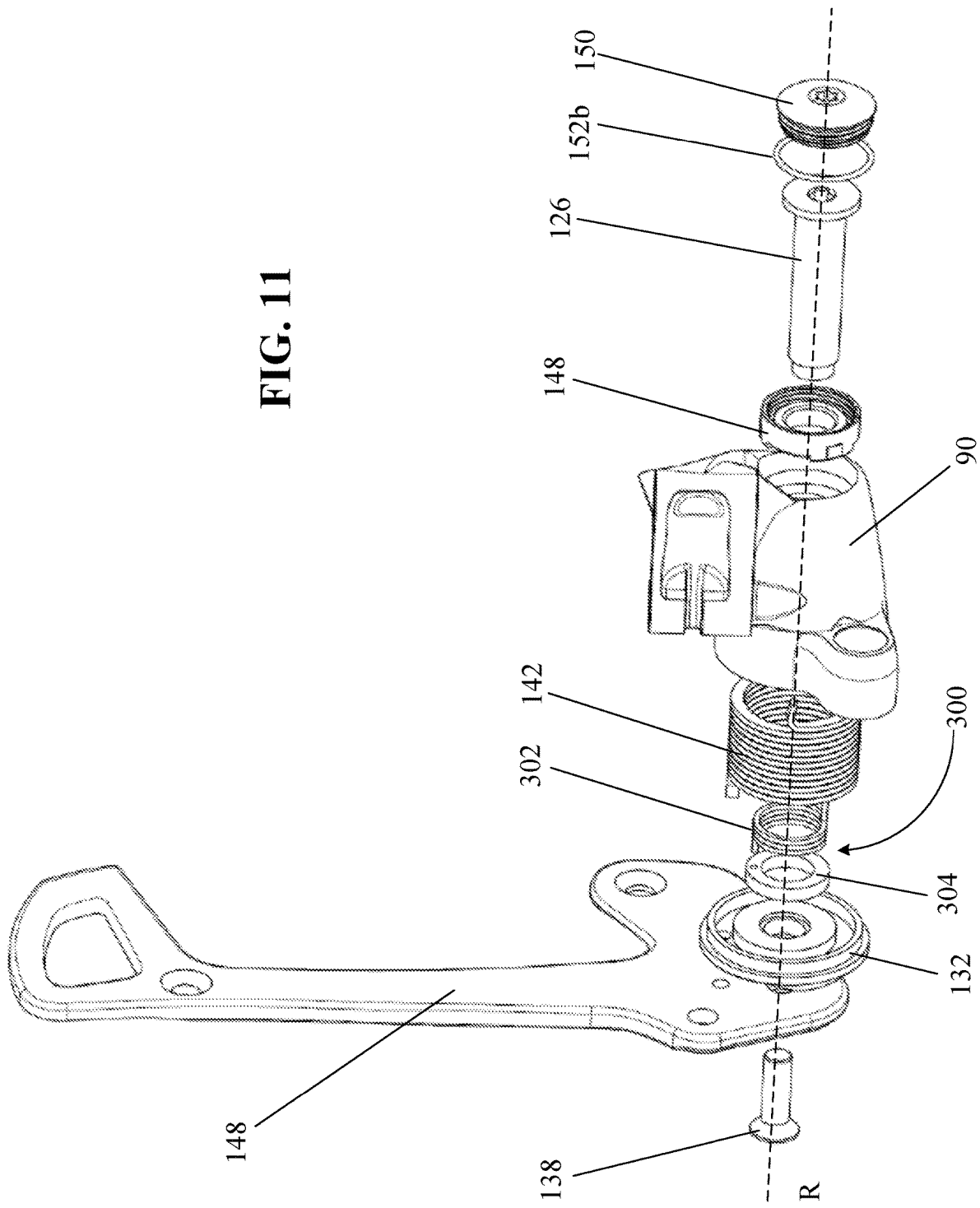
FIG. 11 is an exploded perspective view of a portion of yet another example of a rear derailleur, including a third damper in accordance with the teachings of the present disclosure.
Figure 12:
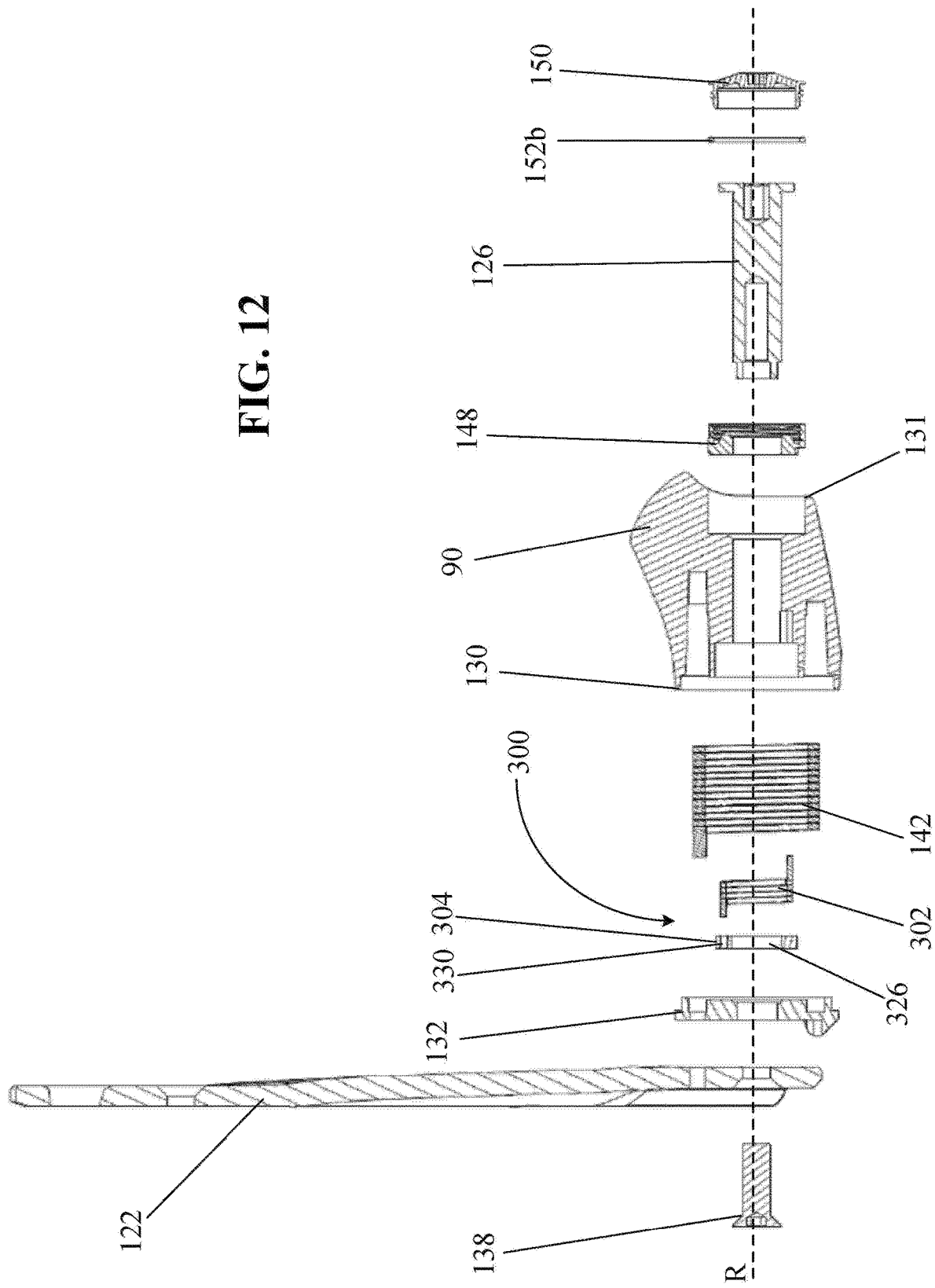
FIG. 12 is an exploded cross-section view taken along a rotation axis of the rear derailleur of FIG. 11.
Figure 13:
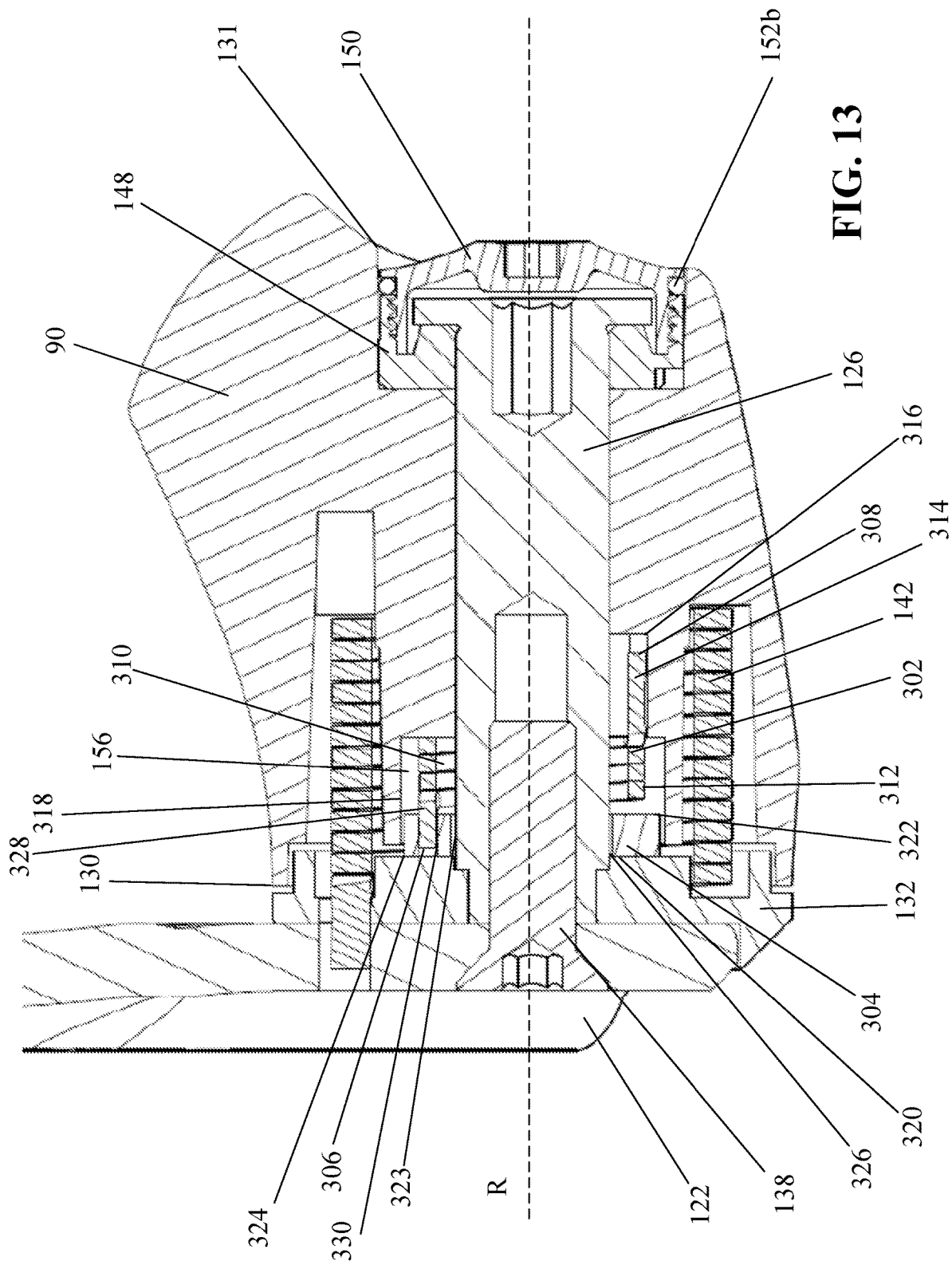
FIG. 13 is a cross-section view taken along the rotation axis of the rear derailleur of FIG. 11, assembled.

A third example of a damper 300 is now described referring to FIGS. 11-13. Though discussed herein as a part of a rear derailleur of a bicycle, the damper 300 may be incorporated onto a chain tensioner or chain guide assembly of a bicycle, where the chain tensioner is not a part of a front or rear derailleur.

The biasing device 142 is a first biasing device, and the damper 300 includes a second biasing device 302 and a friction member 304 (e.g., a rigid washer). The second biasing device 302 may be, for example, a torsion spring. The second biasing device 302 is positioned within the second recess 156, which, unlike with the first example of the damper 120 and the second example of the damper 200 discussed above, extends from the first axial side 130 of the movable member 90 into the movable member 90. The second recess 156 is radially inner relative to the third recess 175.

As shown in FIG. 13, the second biasing device 302 has a first end 306, a second end 308, an inner annular surface 310, and an outer annular surface 312. The second end 308 of the second biasing device 302 engages with a coupling portion of the movable member 90 in a positive-locking manner. In one example, the second end 308 of the second biasing device 302 forms a tab 314 that is insertable into a corresponding recess 316 within the movable member 90. The recess 316 may be adjacent to the second recess 156 and may be sized and shaped to match the size and shape of the tab 314. Additionally or alternatively, the second end 308 of the second biasing device 302 may be non-rotatably attached to the movable member 90 in other ways. For example, the second end 308 of the second biasing device 302 may be non-rotatably attached to the movable member 90 with an adhesive, flanges, other tabs, other connectors, or any combination thereof.

The second biasing device 302 is sized and shaped such that when the second biasing device 302 is positioned within the second recess 156, there is no frictional contact between the second biasing device 302 and the movable member 90 and/or the rotational shaft 126. For example, none of the inner annular surface 310 of the second biasing device 302 may be in physical contact with the rotational shaft 126, and none of the outer annular surface 312 of the second biasing device 302 is in physical contact with a wall 318 that partially defines the second recess 156 within the movable member 90. The length and/or the inner diameter of the second biasing device 302 may be set such that during a maximum loading of the second biasing device 302 (e.g., at a maximum rotation of the chain guide assembly 92, including the intermediate member 132, and the friction member 304 in the damping direction D), the inner annular surface 310 of the second biasing device 302 does not physically contact the rotational shaft 126 (e.g., after the inner diameter of the second biasing device 302 decreases during loading). The size (e.g., the inner diameter and/or the length) of the second biasing device 302 is scalable to increase or decrease frictional forces between the friction member 304 and the intermediate member 132, for example, during operation of the rear derailleur 80.

The second biasing device 302 may be made of any number of materials including, for example, a same material as the first biasing device 142 and/or the friction member 154 of the first example. In one example, the second biasing device 302 is made of a different material than the first biasing device 142.

The friction member 304 is, for example, a rigid washer having a first side 320, a second side 322 opposite the first side 320, an inner annular surface 323, and an outer annular surface 324. The inner annular surface 323 of the friction member 304 defines an opening 326 through the friction member 304.

The friction member 304 is positioned within the movable member 90, such that the rotational shaft 126 extends through the opening 326 through the friction member 304 and the friction member 304 surrounds the rotational shaft 126. In one example, the friction member 304 is positioned about the rotational shaft 126 such that the inner annular surface 323 is not in physical contact with the rotational shaft 126 and the outer annular surface 324 of the friction member 304 is not in physical contact with the wall 318 partially defining the second recess 156 within the movable member 90.

The friction member 304 is at least partially positioned within the second recess 156, between the second biasing device 302 and the intermediate member 132. For example, the first side 320 of the friction member 302 abuts the intermediate member 132, and the second side 322 of the friction member 302 abuts a portion of the second biasing device 302. The first end 306 of the second biasing device 302 engages with a coupling portion of the friction member 304 in a positive-locking manner. In one example, the first end 306 of the second biasing device 302 forms a tab 328 that is insertable into a corresponding opening 330 extending at least partly through the friction member 304. For example, the opening 330 extends entirely through the friction member 304, from the first side 320 of the friction member 302 to the second side 322 of the friction member 304.

In one example, the friction member 304 is made of a first material, and the intermediate member 132 is made of a second material that is different than the first material. The first material and the second material may be any number of materials. For example, the first material is aluminum, and the second material is hardened steel (e.g., 4140 alloy steel). In one example, the second material has a greater hardness than the first material, such that the friction member 304 fails before the intermediate member 132, as the friction member 304 may be easier and less expensive to replace than the rotational shaft intermediate member 132. The first material and/or the second material may be a different material.

The second biasing device 302 biases the friction member 304 (e.g., the first side 320 of the friction member 304) against the intermediate member 132. The second biasing device 304 may be sized (e.g., in length) relative to the second recess 156 such that when the rear derailleur 80 including the damper 300 is assembled and the friction member 304 is positioned between the intermediate member 132 and the second biasing device 302, the second biasing device 302 is at least partly compressed against the intermediate member 132.

The rotational shaft 126, the intermediate member 132, and the outer plate 122 rotate together. The intermediate member 132, which is in frictional engagement with the friction member 304 due to the biasing of the friction member 304 against the intermediate member 132 by the second biasing device 302, rotating causes the friction member 304 to also rotate.

As the friction member 304 rotates with the intermediate member 132 in the damping direction D, the first end 306 of the second biasing device 302 also rotates, causing the length of the second biasing device 302 to increase. The first end 306 of the second biasing device 302 initially rotates with the friction member 304 due to the engagement of the first end 306 of the second biasing device 302 with the coupling portion of the friction member 304 in a positive-locking manner. Due to the sizing of the second biasing device 302 relative to the second recess 156, a point is reached where the length of the second biasing device 302 cannot increase any more, and the friction member 304 stops rotating. The second biasing device 302 generates a greater axial force on the intermediate member 132 via the friction member 302 when the friction member 304 stops rotating, thus restricting rotational motion of the intermediate member 132 and the rotational shaft 126 relative to the movable member 90. When the friction member 304 rotates with the intermediate member 132 in the tensioning direction T, the length of the second biasing device 302 gets smaller and the force applied to the intermediate member 132 via the friction member 304 decreases.

The friction member 304 creates a higher torque on the chain guide assembly (e.g., the intermediate member 132) and thus the rotational shaft 126 when the chain guide assembly 92 and the rotational shaft 126 rotate in the damping direction D compared to when the chain guide assembly 92 and the rotational shaft 126 rotate in the tensioning direction T. Different ratios of torques created by the friction member 304 on the intermediate member 132 and thus the rotational shaft 126 when the chain guide assembly 92 and the rotational shaft 126 rotate in the damping direction D compared to when the chain guide assembly 92 and the rotational shaft 126 rotate in the tensioning direction T, respectively, may be provided based on different sizes, shapes, and/or materials of the second biasing device 302 and/or the friction member 304.

Figure 14:
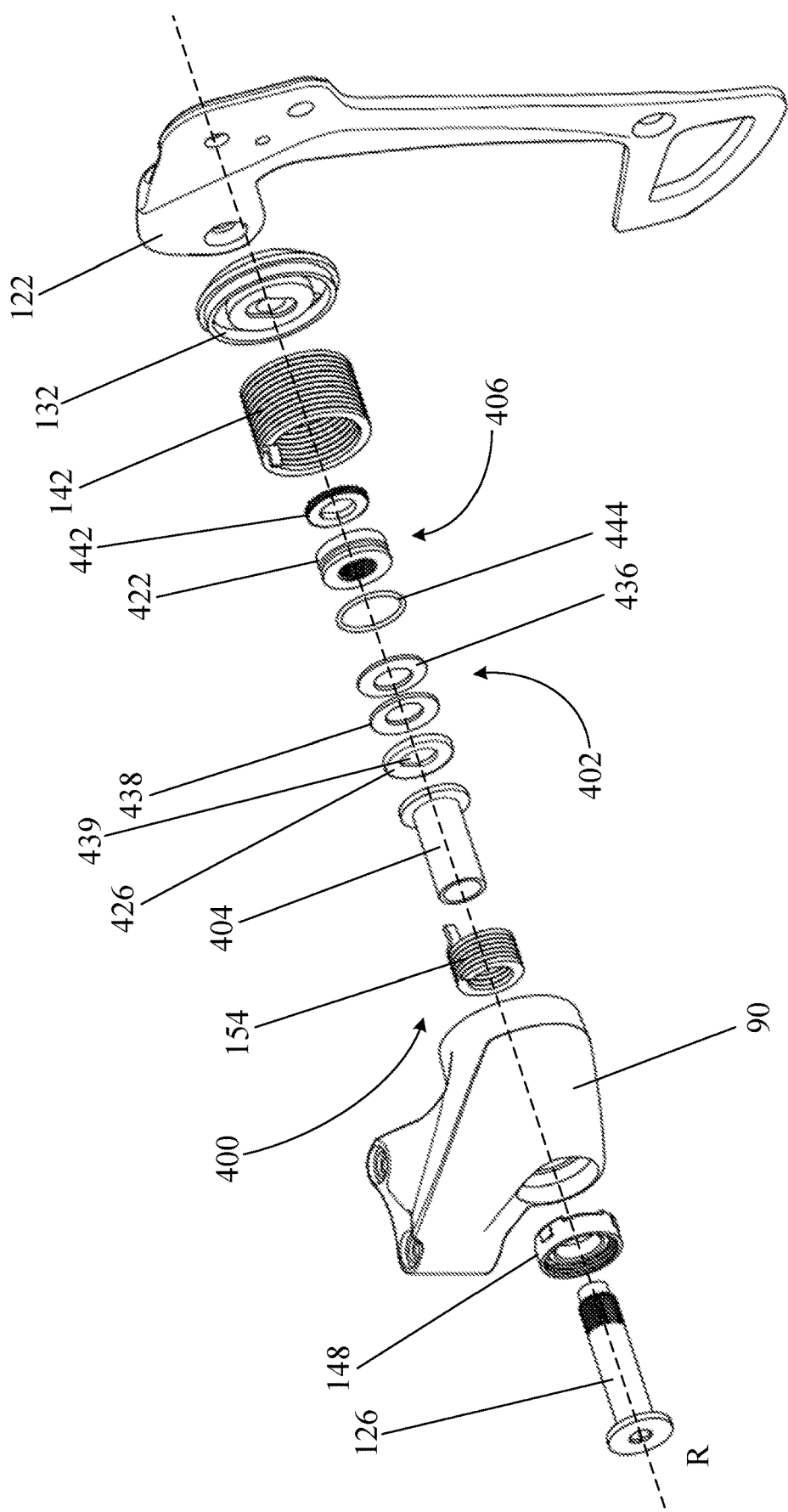
FIG. 14 is an exploded perspective view of a portion of yet another example of a rear derailleur, including a fourth damper in accordance with the teachings of the present disclosure.
Figure 15:
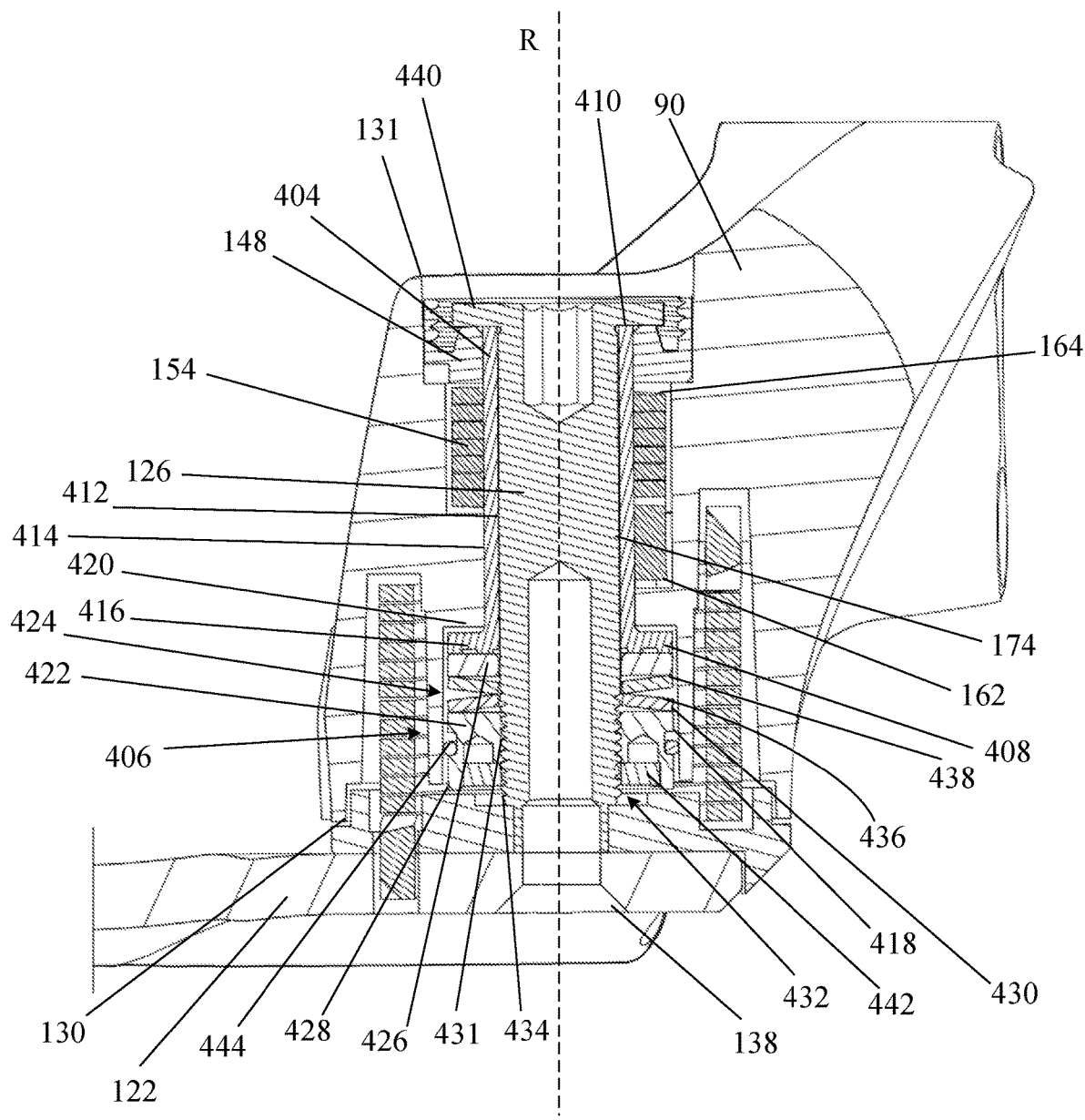
FIG. 15 is a cross-section view taken along the rotation axis of the rear derailleur of FIG. 14, assembled.

A fourth example of a damper 400 is now described referring to FIGS. 14 and 15. Though discussed herein as a part of a rear derailleur of a bicycle, the damper 400 may be incorporated onto a chain tensioner or chain guide assembly of a bicycle, where the chain tensioner is not a part of a front or rear derailleur.

The damper 400 applies the teachings of the first example of the damper 120 in combination with a tunable damper 402. The tunable damper 402 includes a sleeve 404 and an adjustment mechanism 406. As shown in FIG. 15, the sleeve 404 has a first end 408, a second end 410, an inner annular surface 412, and an outer annular surface 414. The sleeve 404 includes, for example, a flange 416 at the first end 408 of the sleeve 404.

The sleeve 404 is positioned about the rotational shaft 126 such that the inner annular surface 412 of the sleeve is in physical contact with (e.g., abuts) or is adjacent to the outer annular surface 170 of the rotational shaft 126. The movable member 90 includes a third recess 418 that extends from the first axial side 130 of the movable member 90 into the movable member 90. When the rear derailleur 80 including the damper 400 is assembled, the flange 416 of the sleeve 404 is positioned within the third recess 418, between a portion 420 of the movable member 90 and the adjustment mechanism 406. The sleeve 404 is rotatable within the movable member 90 and may rotate relative to the rotational shaft 126.

As shown in FIGS. 14 and 15, the adjustment mechanism 406 includes an adjuster 422, a biasing device 424, and a force application member 426 (e.g., a flat washer that is rigid and cylindrical). The adjuster 422 has a first side 428, a second side 430 opposite the first side 428, and includes internal threads 431 that engage with a portion 432 of the rotational shaft 126 that includes corresponding external threads 434.

When the rear derailleur 80, including the damper 400, is assembled, the second side 430 of the adjuster 422 is in physical contact with the biasing device 424. In the example shown in FIGS. 14 and 15, the biasing device 424 includes a first cone washer 436 and a second cone washer 438. In other examples, the biasing device 424 may include more or fewer cone washers or other biasing devices (e.g., a torsion spring). Components of the biasing device 424 (e.g., the first cone washer 436 and the second cone washer 438) may be made of any number of materials including, for example, steel.

The flat washer 426 is disposed between the second cone washer 438 and the flange 416 of the sleeve 404. The flat washer 426 may have any number of shapes and/or sizes including, for example, an inner diameter and an outer diameter that match an inner diameter and an outer diameter of the flange 416, respectively. The flat washer 426 is made of any number of materials including, for example, steel.

In one example, the adjuster 422 is non-rotatably attached to the rotational shaft 126 (e.g., via the internal threads 431 of the adjuster 422 and the external threads 434 on the rotational shaft 126), such that the adjuster 422 rotates with the rotational shaft 126. In other words, the adjuster 422 does not rotate relative to the rotational shaft 126. The biasing device 424 and the flat washer 426 may rotate with the rotational shaft 126 and/or relative to the rotational shaft 126. For example, as shown in FIG. 14, the flat washer 426 includes an opening 439 through which the rotational shaft 126 extends. The opening 439 may be any number of sizes and/or shapes. As shown in the example of FIG. 14, the opening 439 may be D-shaped such that a wall defining the D-shaped opening 439 engages with and is rotationally fixed relative to the rotational shaft 126 when the rotational shaft 126 extends through the D-shaped opening 439. An outer diameter of the flat washer 426 may be sized to match an outer diameter of the flange 416 of the sleeve 404, the adjuster 422, the first cone washer 436, the second cone washer 438, or another component of the damper 400. Other configurations may be provided.

The adjuster 422 is screwed onto the rotational shaft 126 via the internal threads 431 of the adjuster 422 and the external threads 434 of the rotational shaft 126. A distance (e.g., a number of turns) the adjuster 422 is screwed onto the rotational shaft 126 sets a force applied by the biasing device 424 on the flat washer 426, and thus the flange 416 of the sleeve 404. The force applied to the flange 416 causes the second end 410 of the sleeve 404 to press against a flange 440 of the rotational shaft 126. The frictional engagement between the flat washer 426 and the flange 416 of the sleeve 404 and the frictional engagement between the second end 410 of the sleeve 404 and the flange 440 of the rotational shaft generate a torque on the rotational shaft 126.

The adjustment mechanism 406 may include more, fewer, and/or different components. For example, as shown in the example of FIGS. 14 and 15, the adjustment mechanism 406 may also include another flat washer 442 and a sealing member 444 (e.g., an O-ring) to seal the adjuster 422 and at least a portion of the third recess 418, respectively.

Once the adjuster 422 is set on the rotational shaft 126, the axial force applied by the second end 410 of the sleeve 404 on the flange 440 of the rotational shaft 126 may be the same regardless of the rotational direction of the chain guide assembly 92, or may vary based on the rotational direction of the chain guide assembly 92. For example, if the adjuster 422 rotates with the rotational shaft 126, a distance between the first side 428 of the adjuster 422 and the flange 440 of the rotational shaft 126 does not change. If the adjuster 422 does not rotate with the rotational shaft 126, the distance between the first side 428 of the adjuster 422 and the flange 440 of the rotational shaft 126 (e.g., due to the engagement between the external threads 434 of the rotational shaft 126 and the internal threads 431 of the adjuster 422) may change. The distance between the first side 428 of the adjuster 422 and the flange 440 of the rotational shaft 126 may decrease enough that the sleeve 404 becomes rotationally fixed relative to the rotational shaft 126.

In one example, the frictional engagement between the second end 410 of the sleeve 404 and the flange 440 of the rotational shaft 126 generates a torque on the rotational shaft 126 and thus the chain guide assembly 92 when the chain guide assembly 92 and the rotational shaft 126 rotate in the damping direction D and the tensioning direction T.

As discussed above with reference to the first example, the friction member 154 may act as a spring clutch. More specifically, when the sleeve 404 rotates in the damping direction D (e.g., in response to the chain guide assembly 92 and the rotational shaft 126 rotating in the damping direction D), with the first end 162 of the friction member 154 non-rotatably attached to the movable member 90 and the second end 164 of the friction member 154 being free to move, the frictional engagement between the friction member 154 and the sleeve 404 causes the inner diameter of the friction member 154 to get smaller and the length of the friction member 154 to get longer. When the sleeve 404 rotates in the tensioning direction T (e.g., in response to the chain guide assembly 92 and the rotational shaft 126 rotating in the tensioning direction T), the frictional engagement between the friction member 154 and the sleeve 404 causes the inner diameter of the friction member 154 to get larger and the length of the friction member 154 to get shorter. The friction member 154 thus creates a higher torque on the sleeve 404 when the sleeve 404 rotates in the damping direction D compared to when the sleeve 404 rotates in the tensioning direction T. Different ratios of torques created by the friction member 154 on the sleeve 404 when the sleeve 404, the chain guide assembly 92, and the rotational shaft 126 rotate in the damping direction D compared to when the sleeve 404, the chain guide assembly 92, and the rotational shaft 126 rotate in the tensioning direction T, respectively, may be provided based on different sizes, shapes, and/or materials of the friction member 154 and/or the sleeve 404.

If the sleeve 404 is rotationally fixed relative to the rotational shaft 126, the friction member 154 acts on the rotational shaft 126, via the sleeve 404, in the same way as discussed above with reference to the first example. If the sleeve 404 is rotatable relative to the rotational shaft 126, frictional engagement between the inner annular surface 412 of the sleeve 404 and the rotational shaft 126 and frictional engagement between the outer annular surface 414 of the sleeve 404 and the friction member 154 generate a torque on the rotational member 126.

The frictional torque created by the friction members of the present embodiments when the chain guide assembly 92 rotates in the damping direction D may limit the amount of vertical chain movement when the bicycle 50, for example, is subject to ground input. Compared to the prior art, friction members of the present embodiments are low in weight and cost to manufacture, and are easy to install within a finished bicycle. The friction members of the present embodiments also provide a relatively stable torque output range if parts (e.g., the friction member 154) are manufactured within tolerance.

Each of the above-described examples of a spring damper illustrates that the configuration and construction of the dampers can be varied in different ways. However, other examples different from those disclosed and described herein are also possible. The invention and the disclosure are not intended to be limited to only the examples discussed above.

Although certain dampers, bicycle derailleurs, and bicycles have been described herein in accordance with the teachings of the present disclosure, the scope of coverage of this patent is not limited thereto. On the contrary, this patent covers all embodiments of the teachings of the disclosure that fairly fall within the scope of permissible equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive. For example, the methods and techniques described herein are explained with reference to bicycle components, however, it is understood that the intended scope of the application may include non-bicycle components as well.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A bicycle rear derailleur comprising:
a base member mountable to a bicycle frame;
a movable member movably coupled to the base member;
a chain guide assembly rotatably connected to the movable member;
a pivot member non-rotatably coupled to the chain guide assembly and having an outer annular surface;
a biasing device configured to bias the chain guide assembly in a first rotational direction relative to the movable member; and
a damper device disposed within the movable member, the damper device operable to apply a damping force to the chain guide assembly when the chain guide assembly rotates in a second rotational direction relative to the movable member, the second rotational direction being opposite the first rotational direction, the damper device including:
a friction device, the friction device including a friction member having at least one friction surface biased against and in kinetic frictional engagement with the pivot member.

2. The bicycle rear derailleur of claim 1, wherein the friction member is a torsion spring including a tab at a first end of the friction member, the tab of the torsion spring being positioned within a corresponding recess within the movable member, and
wherein the torsion spring is configured to apply a radial spring force to the pivot member as the chain guide assembly rotates in the second rotational direction relative to the movable member from a first rotational position to a second rotational position, the radial spring force being greater and an inner diameter of the torsion spring being smaller when the chain guide assembly is in the second rotational position compared to when the chain guide assembly is in the first rotational position.

3. The bicycle rear derailleur of claim 2, wherein the movable member has a first side and a second side, the second side being opposite the first side,
wherein the movable member includes a first recess at the first side and a second recess at the second side, and
wherein the torsion spring is positioned within the first recess, and the biasing device is positioned within the second recess.

4. The bicycle rear derailleur of claim 1, wherein the friction device is configured to generate a higher torque on the pivot member when the chain guide assembly rotates in the second rotational direction compared to when the chain guide assembly rotates in the first rotational direction.

5. The bicycle rear derailleur of claim 1, wherein the friction member has a first end and a second end, the first end and the second end being movable relative to the movable member.

6. The bicycle rear derailleur of claim 1, wherein the friction member has a first end and a second end, the first end being positionally fixed relative to the movable member, the second end being movable relative to the movable member.

7. The bicycle rear derailleur of claim 6, wherein the friction member is a torsion spring including a tab at the first end, the tab of the torsion spring being positioned within a corresponding recess within the movable member.

8. The bicycle rear derailleur of claim 7, wherein the at least one friction surface is a surface of the torsion spring, a first portion of the torsion spring being biased against and in frictional engagement with a portion of the pivot member, and a second portion of the torsion spring being biased against and in frictional engagement with a portion of the movable member.

9. The bicycle rear derailleur of claim 8, wherein the pivot member is made of a first material, and the portion of the movable member is made of a second material, the second material being different than the first material.

10. A damper device for a bicycle rear derailleur, the damper device being disposable within a movable member of the bicycle rear derailleur, the damper device operable to apply a damping force to a chain guide assembly rotatably attached to the movable member via a pivot member as the chain guide assembly rotates in a rotational direction relative to the movable member, the damper device comprising:
a friction device, the friction device including a friction member having a portion non-rotatably coupled to the moveable member and having at least one friction surface biased against and in frictional engagement with the pivot member.

11. The damper device of claim 10, wherein the friction member includes a torsion spring having a first end and a second end.

12. The damper device of claim 11, wherein the torsion spring is configured to apply a radial spring force to the pivot member as the chain guide assembly rotates in the rotational direction relative to the movable member from a first rotational position to a second rotational position, the radial spring force being greater and an inner diameter of the torsion spring being smaller when the chain guide assembly is in the second rotational position compared to when the chain guide assembly is in the first rotational position.

13. The damper device of claim 11, wherein the rotational direction is a first rotational direction and the chain guide assembly is rotatable in a second rotational direction, the second rotational direction being opposite the first rotational direction, and wherein the friction device is configured to generate a higher torque on the pivot member when the chain guide assembly rotates in the first rotational direction compared to when the chain guide assembly rotates in the second rotational direction.

14. The damper device of claim 10, wherein the friction member has a first end and a second end, the first end and the second end being movable relative to the movable member.

15. A bicycle rear derailleur comprising:

a base member mountable to a bicycle frame;

a movable member movably coupled to the base member;

a chain guide assembly rotatably connected to the movable member;

a pivot member non-rotatably coupled to the chain guide assembly and having an outer annular surface;

a biasing device configured to bias the chain guide assembly in a first rotational direction relative to the movable member; and a damper device disposed within the movable member, the damper device operable to apply a damping force to the chain guide assembly when the chain guide assembly rotates in a second rotational direction relative to the movable member, the second rotational direction being opposite the first rotational direction, the damper device including:

a friction member, the friction member having at least one friction surface in kinetic frictional engagement with the pivot member, wherein the friction member is configured to generate a higher torque on the pivot member when the chain guide assembly rotates in the second rotational direction compared to when the chain guide assembly rotates in the first rotational direction.

16. The bicycle rear derailleur of claim 15, wherein the friction member is always in physical contact with the pivot member.

17. The bicycle rear derailleur of claim 16, wherein the friction member has a first end and a second end, the first end being positionally fixed relative to the movable member.

18. The bicycle rear derailleur of claim 17, wherein the friction member is a torsion spring, the first end of the torsion spring being positioned within a corresponding recess within the movable member.

19. The bicycle rear derailleur of claim 18, wherein the at least one friction surface is a surface of the torsion spring biased against and in frictional engagement with the pivot member, and wherein the torsion spring is configured to apply a radial spring force to the pivot member as the chain guide assembly rotates in the second rotational direction relative to the movable member from a first rotational position to a second rotational position, the radial spring force being greater and an inner diameter of the torsion spring being smaller when the chain guide assembly is in the second rotational position compared to when the chain guide assembly is in the first rotational position.

20. The bicycle rear derailleur of claim 15, wherein the friction member has a first end and a second end, the first end and the second end being movable relative to the movable member.

\* \* \* \* \*